(12) United States Patent
Hinque et al.

(10) Patent No.: US 8,662,127 B2
(45) Date of Patent: Mar. 4, 2014

(54) PUMP AND ACTUATOR ASSEMBLY FOR A SELF-INFLATING TIRE

(75) Inventors: Daniel Paul Luc Marie Hinque, Habay-la-Neuve (BE); Jean Joseph Victor Collette, Arlon (BE); René Louis Bormann, Moesdorf (LU); Massimo Di Giacomo Russo, Olm (LU); Gilles Bonnet, Niederfeulen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 639 days.

(21) Appl. No.: 12/975,461

(22) Filed: Dec. 22, 2010

(65) Prior Publication Data

US 2012/0160386 A1   Jun. 28, 2012

(51) Int. Cl.
   *B60C 23/12*   (2006.01)
(52) U.S. Cl.
   USPC ............................................. 152/426; 152/418
(58) Field of Classification Search
   USPC ......... 152/415, 418, 419, 423, 424, 425, 426, 152/429, DIG. 5; 417/233, 375, 379, 383
   See application file for complete search history.

(56) References Cited

U.S. PATENT DOCUMENTS

| 3,304,981 | A | * | 2/1967 | Sheppard | 152/426 |
| 3,971,425 | A | | 7/1976 | Tsuruta | 152/418 |
| 4,169,497 | A | | 10/1979 | Tsuruta | 152/481 |
| 5,679,187 | A | * | 10/1997 | Price | 152/415 |
| 7,322,392 | B2 | * | 1/2008 | Hawes | 152/419 |

| 2004/0007302 | A1 | 1/2004 | Hamilton et al. | 152/416 |
| 2006/0283534 | A1 | 12/2006 | Hawes | 152/415 |
| 2009/0044891 | A1 | 2/2009 | Lee | 152/416 |

FOREIGN PATENT DOCUMENTS

| CN | 1111575 A | 11/1995 | B60C 23/10 |
| DE | 3433318 | 3/1986 | B60C 23/00 |
| JP | 2009173044 | 8/2009 | B60C 23/00 |
| WO | 2007/134556 | 11/2007 | B60C 23/00 |
| WO | 2010/110905 A1 | 9/2010 | B60C 23/12 |

OTHER PUBLICATIONS

European Search Report completed Apr. 23, 2012.

* cited by examiner

*Primary Examiner* — Kip T Kotter
(74) *Attorney, Agent, or Firm* — Richard B. O'Planick

(57) ABSTRACT

A self-inflating tire system includes a compression actuator assembly mounted to a tire carcass for compressing air for delivery to a tire cavity. The compression actuator assembly includes a hollow containment body formed from a resilient deformable material composition and containing a quantity of a non-compressible medium. The containment body is affixed to a relatively high flex-deformation region of the tire carcass and reciprocally transforms between a deformed state and a non-deformed state responsive to deformation and recovery of the tire high flex-deformation region in a rolling tire. Accordingly, the containment body in the deformed state displaces a pressurized displaced quantity of the non-compressible medium which generates a compression force for application to a volume of air delivered to the tire cavity. A pump assembly affixes to the tire carcass and includes valves for reciprocally opening and closing the inlet opening and the outlet opening of a compressor body synchronously with the cyclic transformation of the containment body.

17 Claims, 23 Drawing Sheets

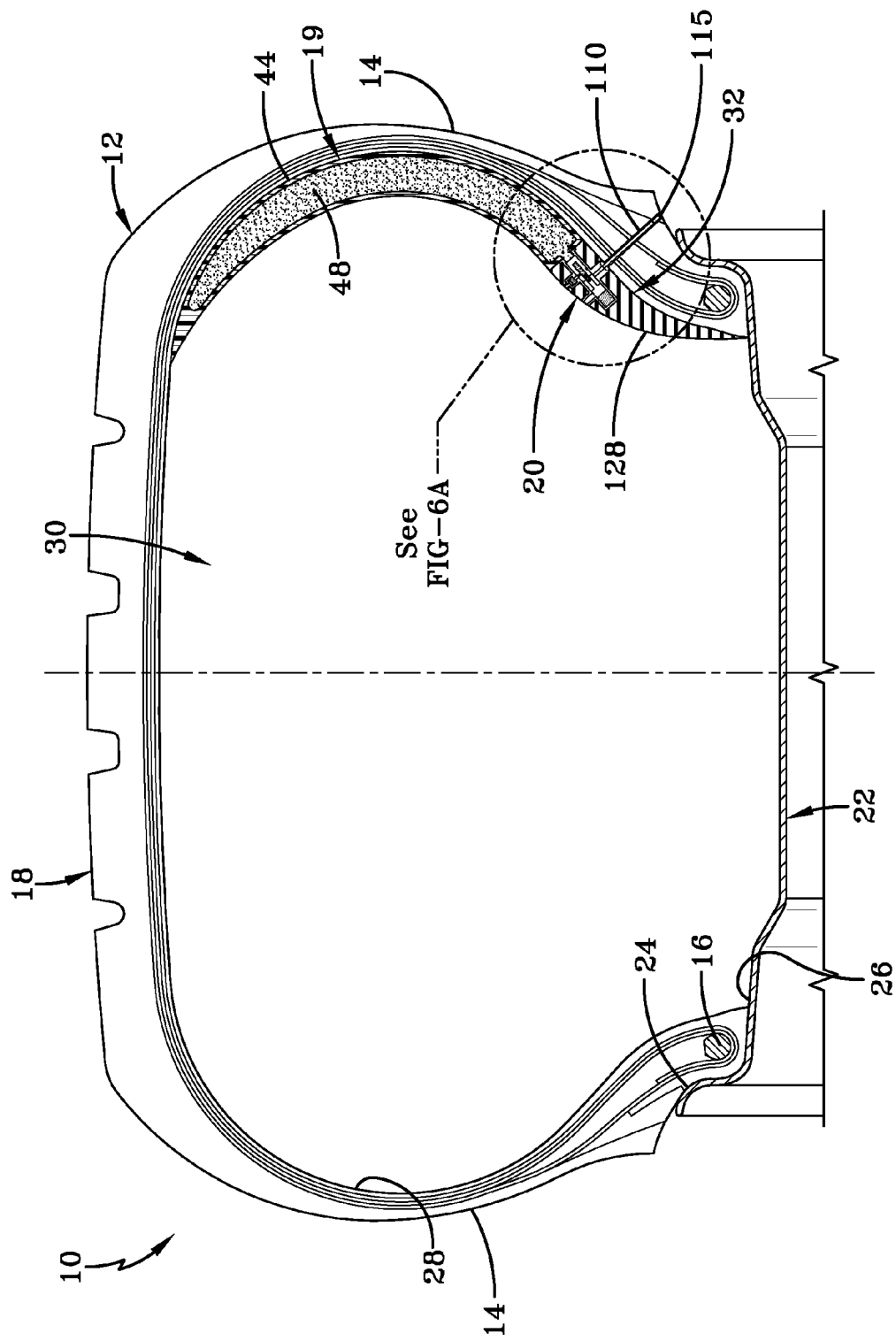

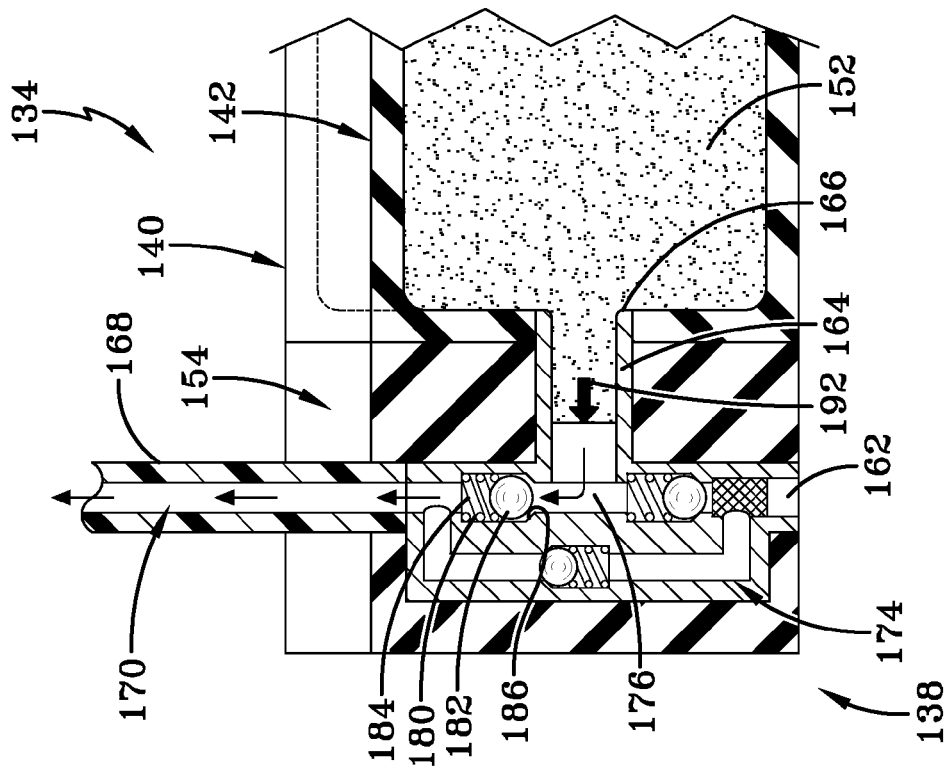
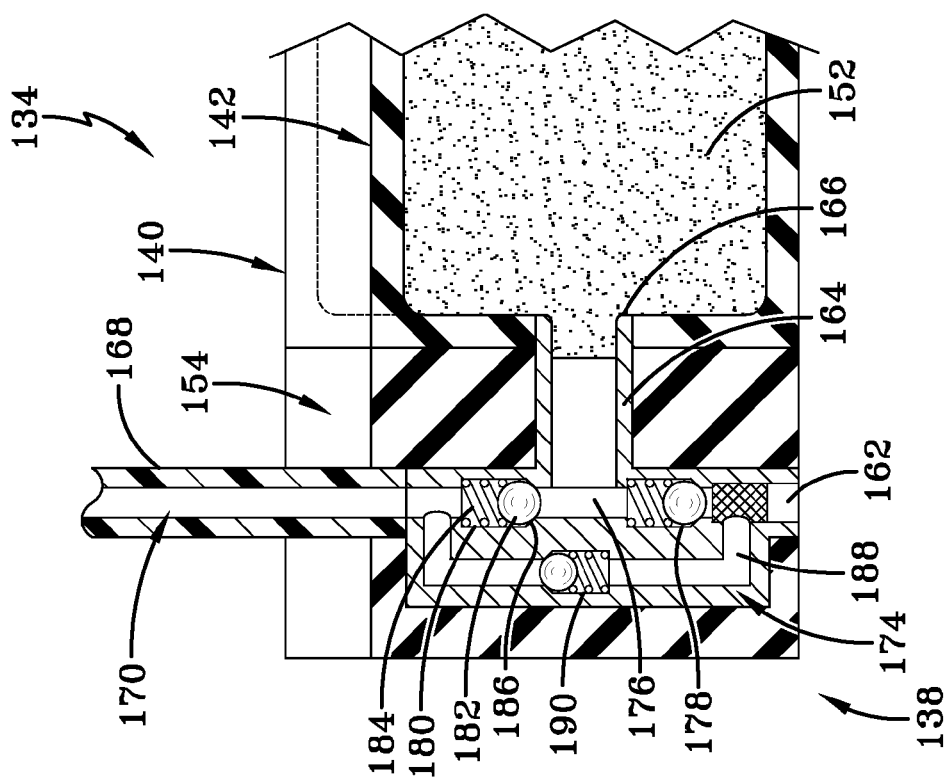

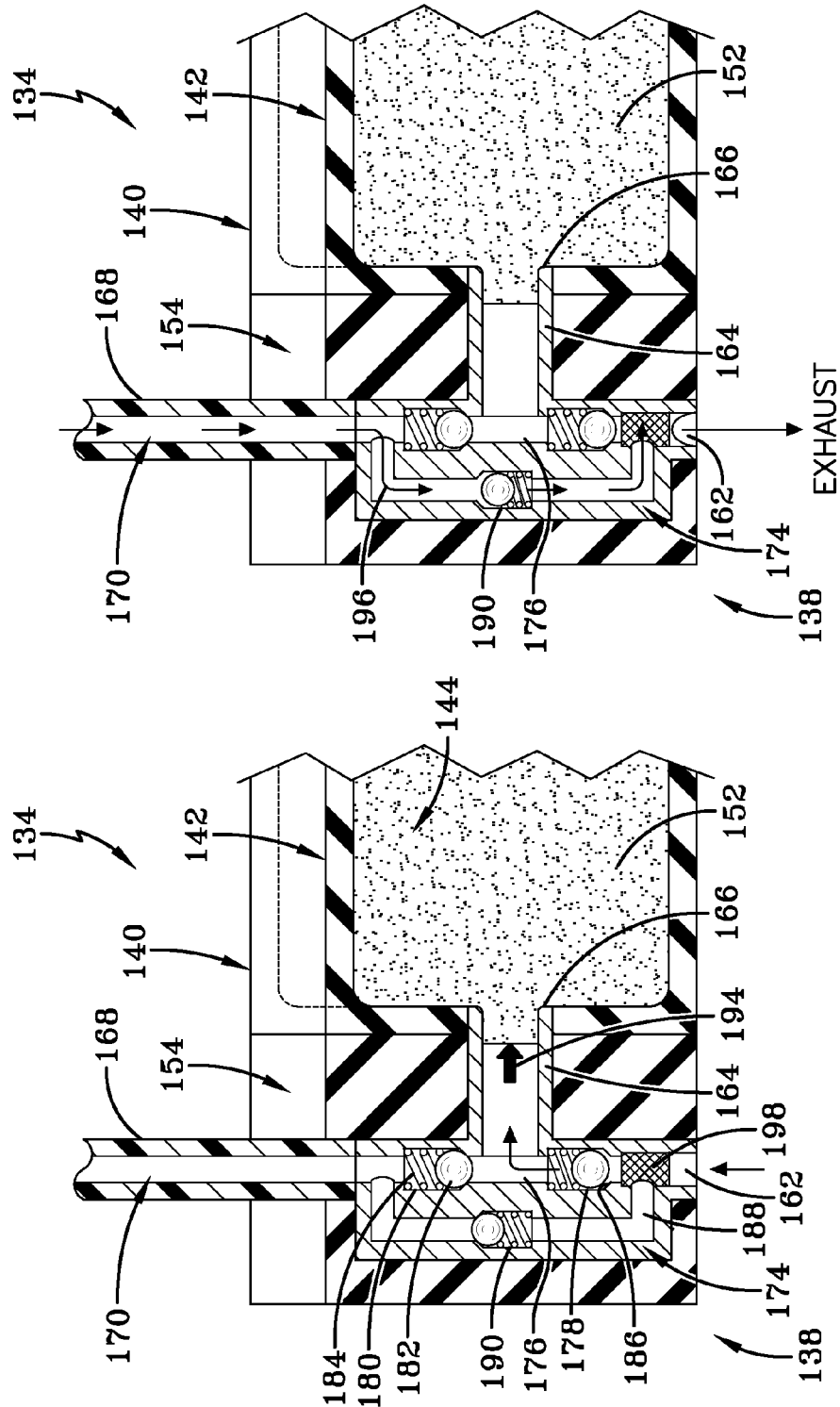

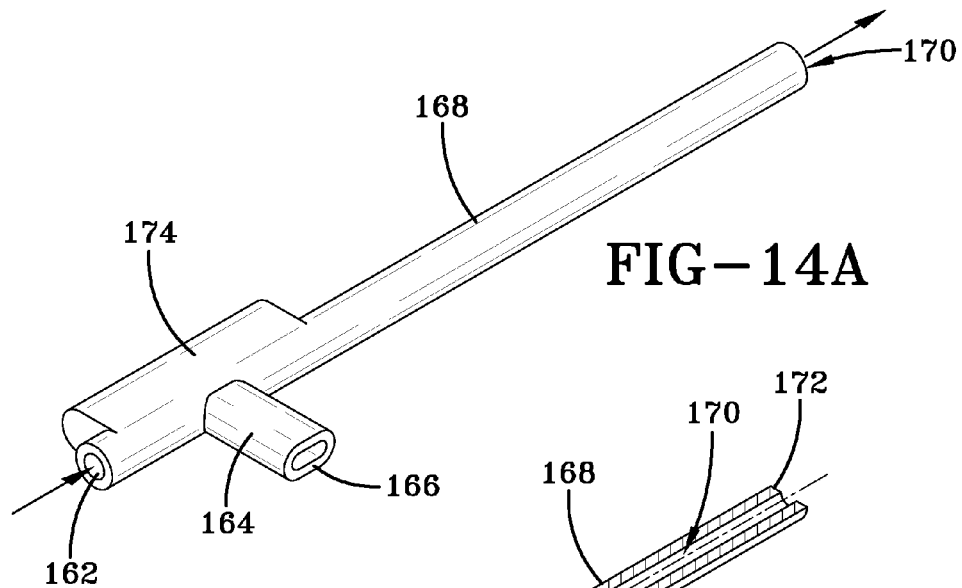
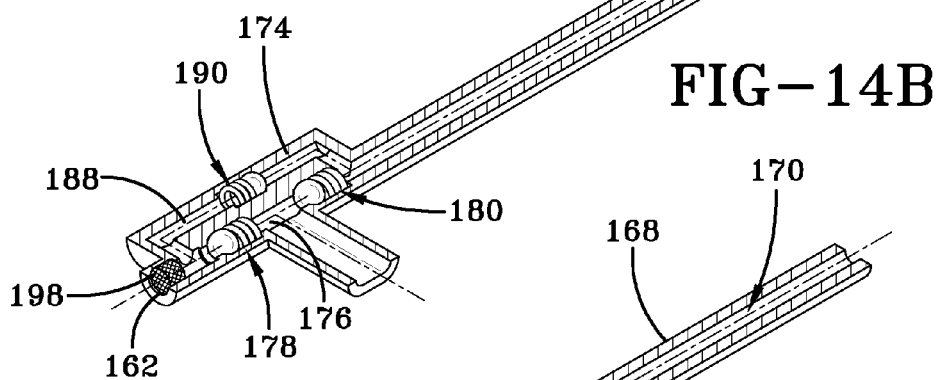
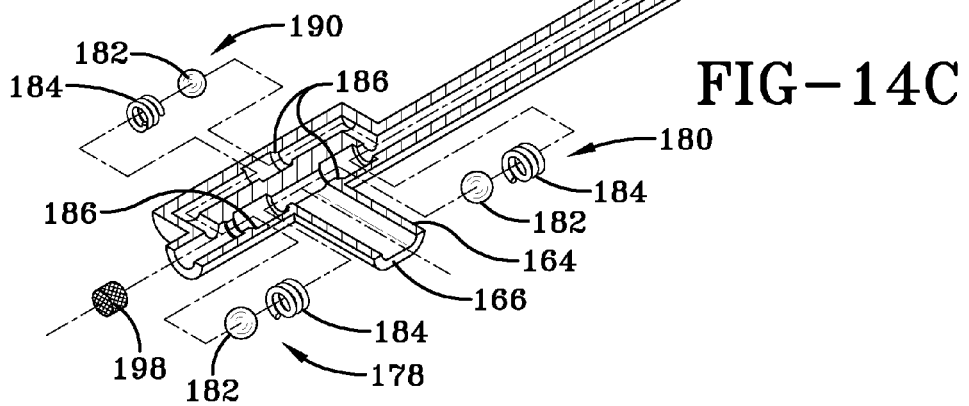

PUMP AND ACTUATOR ASSEMBLY FOR A SELF-INFLATING TIRE

FIELD OF THE INVENTION

The invention relates generally to self-inflating tires and, more specifically, to a self-inflating tire having an integrated air pumping system.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependant upon the driver taking remedial action when warned to re-inflate a tire to recommended pressure. It is a desirable, therefore, to incorporate a self-inflating feature within a tire that will self-inflate the tire.

SUMMARY OF THE INVENTION

In one aspect of the invention, a self-inflating tire system includes a compression actuator assembly mounted to a tire carcass for compressing air for delivery to a tire cavity. The compression actuator assembly includes a hollow containment body formed from a resilient deformable material composition and containing a quantity of a non-compressible medium. The containment body is affixed to a relatively high flex-deformation region of the tire carcass and reciprocally transforms between a deformed state and a non-deformed state responsive to deformation and recovery of the tire high flex-deformation region in a rolling tire. Accordingly, the containment body in the deformed state displaces a pressurized displaced quantity of the non-compressible medium which generates a compression force for application to a volume of air delivered to the tire cavity. The compression force is proportionate to the pressurized displaced quantity of the non-compressible medium and the containment body undergoes a cyclic transformation between the deformed state and the non-deformed state responsive to tire revolution against a ground surface.

In another aspect, a relief valve assembly mounts to the tire carcass and releases air from the tire cavity through the compression assembly when the tire cavity air pressure exceeds a preset tire inflation pressure.

A pump assembly, according to another aspect of the invention, affixes to the tire carcass and includes a compressor body having an internal air chamber, the air chamber having an inlet opening for admitting air into the internal air chamber and an outlet opening for conducting air from the internal air chamber to the tire cavity. The air compressor body further includes a first valve and a second valve within the air compressor body for reciprocally opening and closing the inlet opening and the outlet opening, respectively, synchronous with the cyclic transformation of the containment body.

Pursuant to a further aspect, the compression actuator assembly may be alternatively configured from the group including first and second one-way valve devices positioned at respective opposite ends of the internal chamber of the air compressor body; and coupled first piston and second piston members reciprocally moving between open and closed positions within the compression body. The compression actuator assembly in each of the alternative configurations operates synchronously with the cyclic transformation of the containment body.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 4 is a sectioned view taken from 4-4 of FIG. 3A.

FIG. 13A is a sectioned view taken from 13A-13A of FIG. 11A with the pump shown at rest.

FIG. 13B is a sectioned view taken from 13B-13B of FIG. 12A, with viscoelastic material filling the chamber and pushing air through a second one-way valve into the tire cavity.

FIG. 13C is a sectioned view showing viscoelastic material returning to the upper housing and pulling outside air through the first one-way valve and filling the inner chamber.

FIG. 13D is a sectioned view showing the relief valve releasing cavity over pressure to the atmosphere.

FIG. 14A is a perspective view of the pump body insert.

FIG. 14B is a perspective cross section view of the pump body insert.

FIG. 14C is a perspective exploded cross section view of the pump body insert.

DETAILED DESCRIPTION OF THE INVENTION

Figure 1:
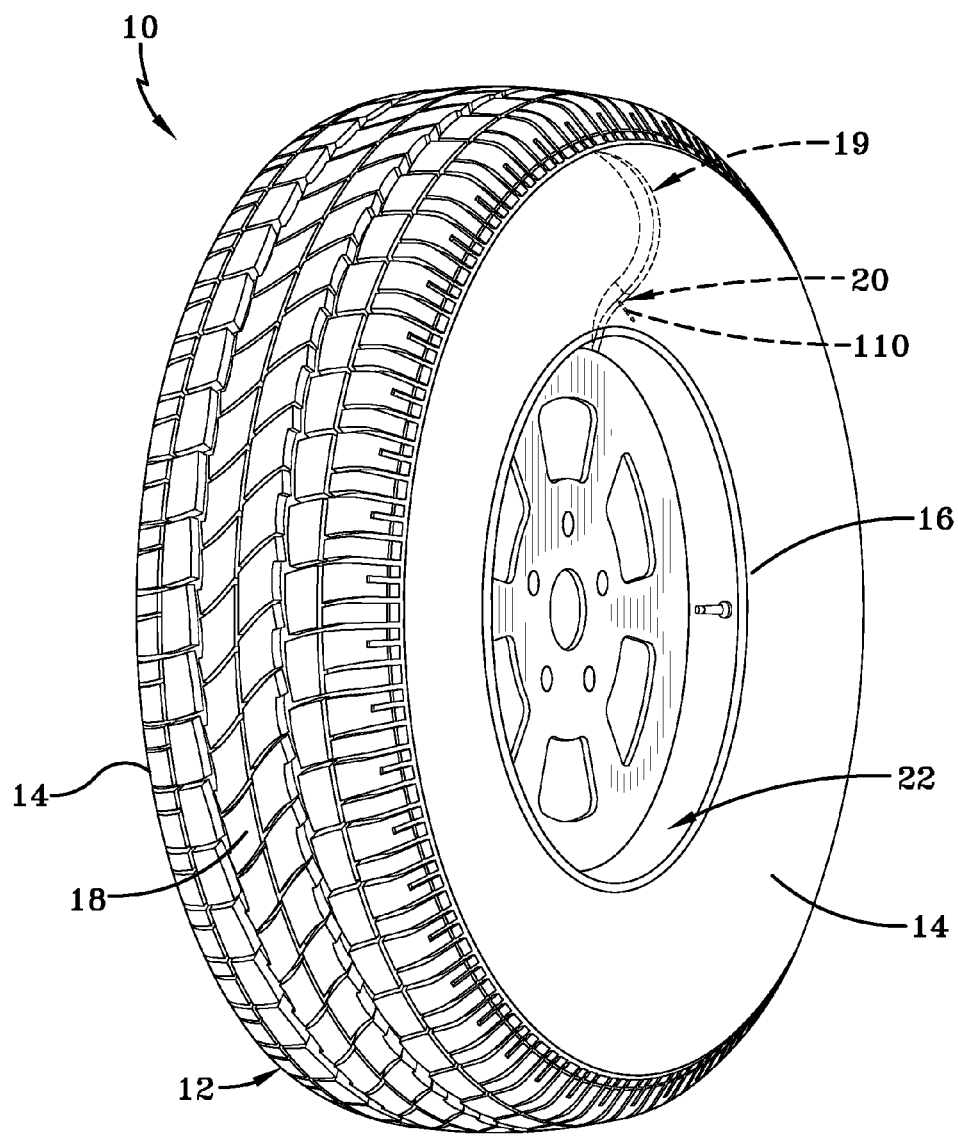
FIG. 1 is a perspective view of the tire system showing pump location (1st embodiment).
Figure 2A:
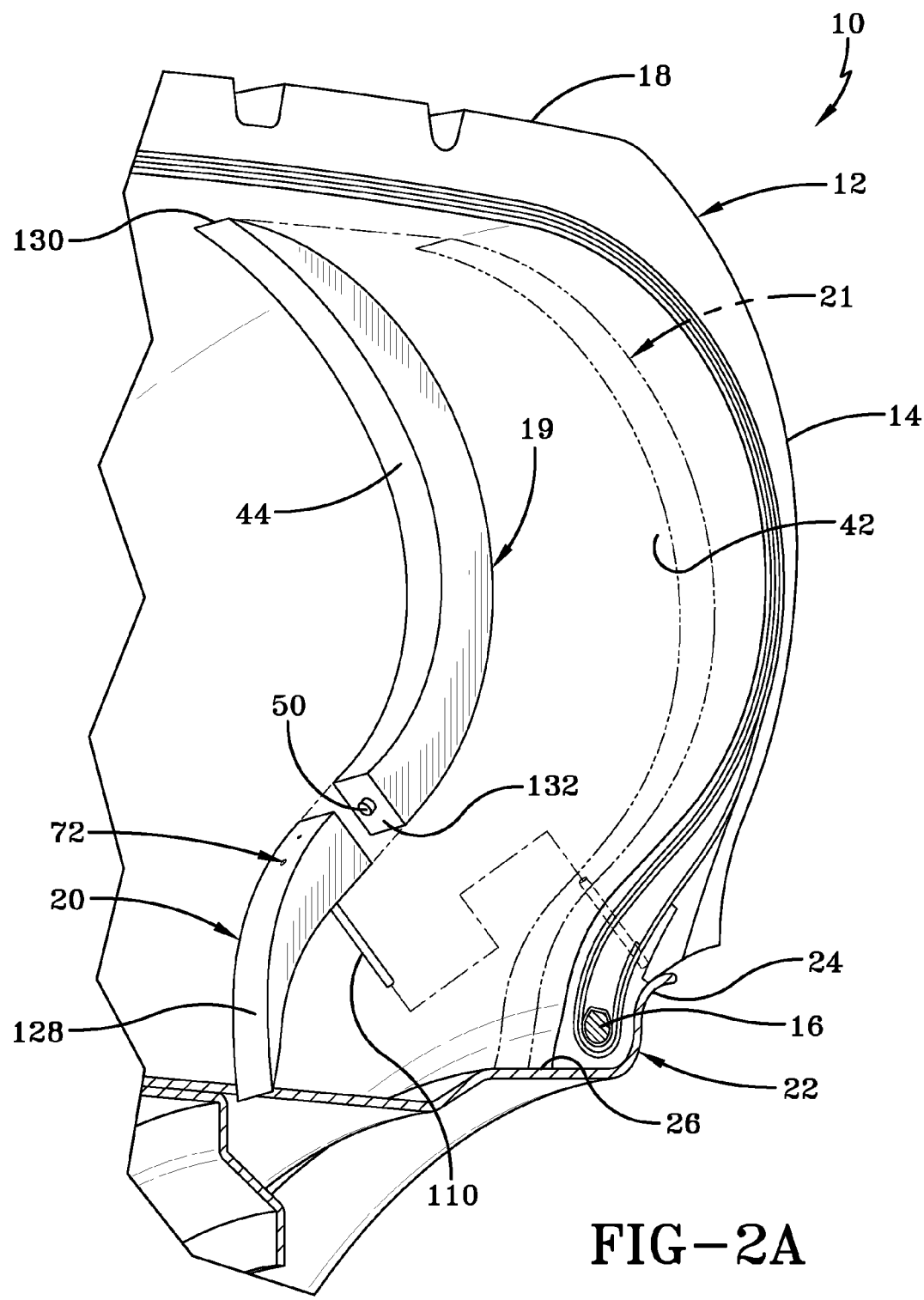
FIG. 2A is a perspective cut away of the tire showing (2) part pump before assembly, and the phantom box shown to illustrate the glue area on inner wall.
Figure 2B:
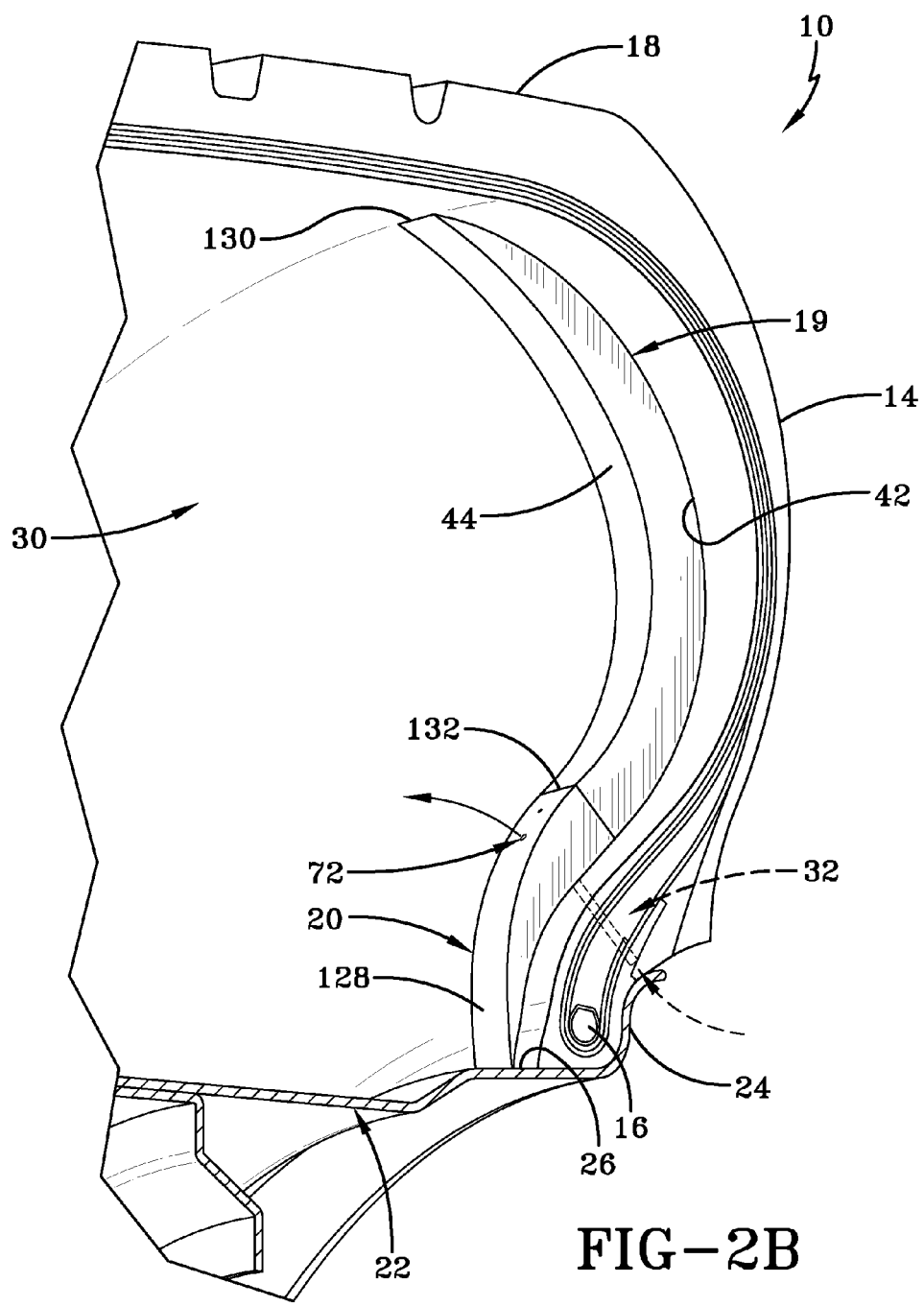
FIG. 2B is a perspective cut away of tire showing (2) part pump assembled with tube inserted through tire wall.

Referring to FIGS. 1, 2A, 2B, 3A, 3B, and 4, the subject Self-Inflating Tire System 10 is shown to include a tire carcass 12 of generally conventional construction having a pair of sidewalls 14, a pair of beads 16, and a tread 18. The tire 12 is configured to be self-inflating by inclusion of a pump assembly 20 and coupled compression actuator assembly 19, both of which being attached to the tire in a post-cure assembly procedure. As shown in FIG. 2A, the assembly 19 may be mounted to a sidewall 14 by application of adhesive as shown in phantom as adhesive area 21. The tire 12 mounts conventionally to a rim 22 having a tire mounting surface 26 and an outer rim flange 24 extending from surface 26. The tire 12 is further formed to provide an inner liner component 28 which defines and encloses an internal tire air cavity 30. Adhesive is applied to the sidewall region of the inner liner 28 as depicted by area 21. The tire 12 is formed to further provide a lower sidewall region 32 proximate to the bead areas 16 of the tire.

Figure 3A:
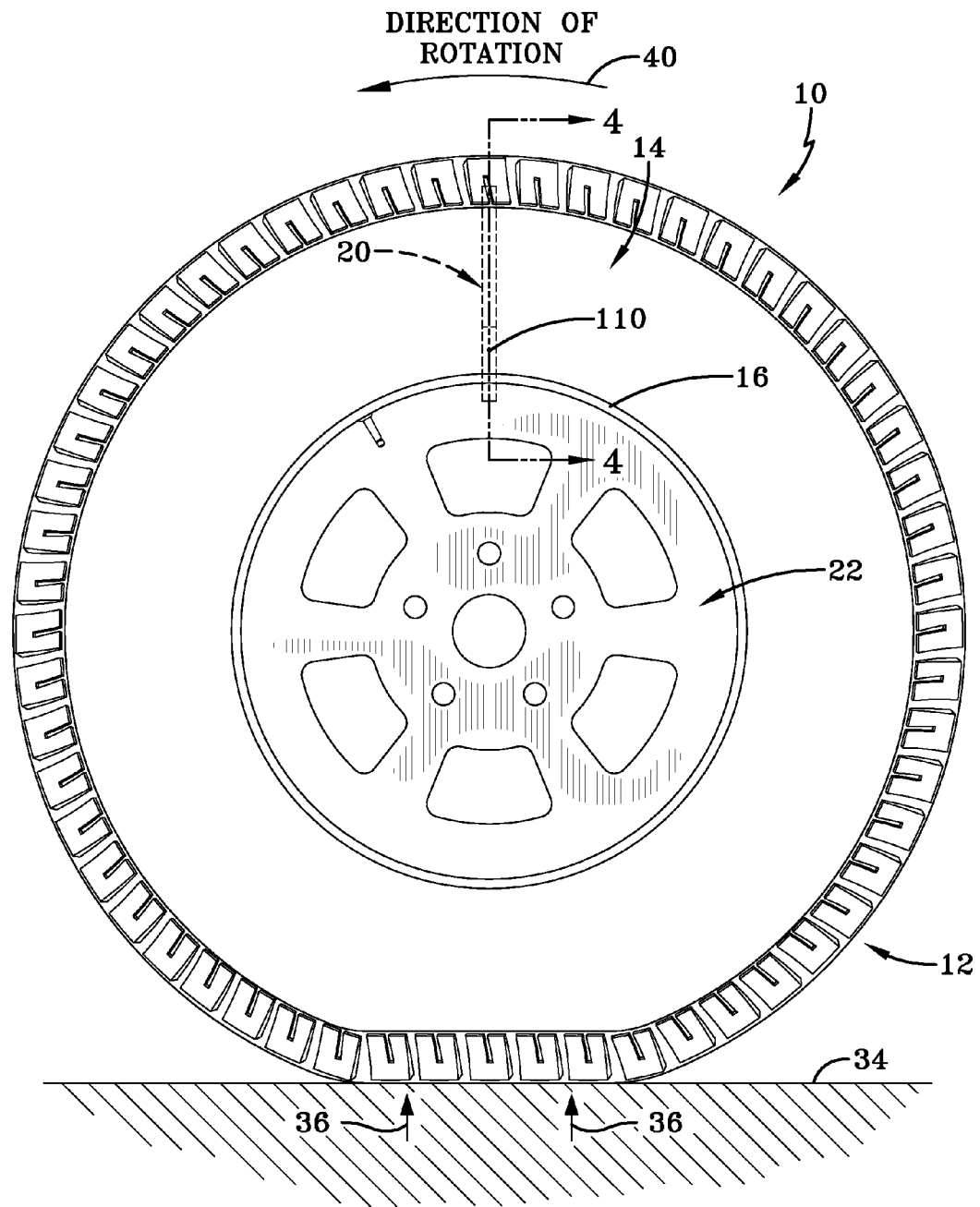
FIG. 3A is a side view showing pump location in non-compressed area of tire.
Figure 3B:
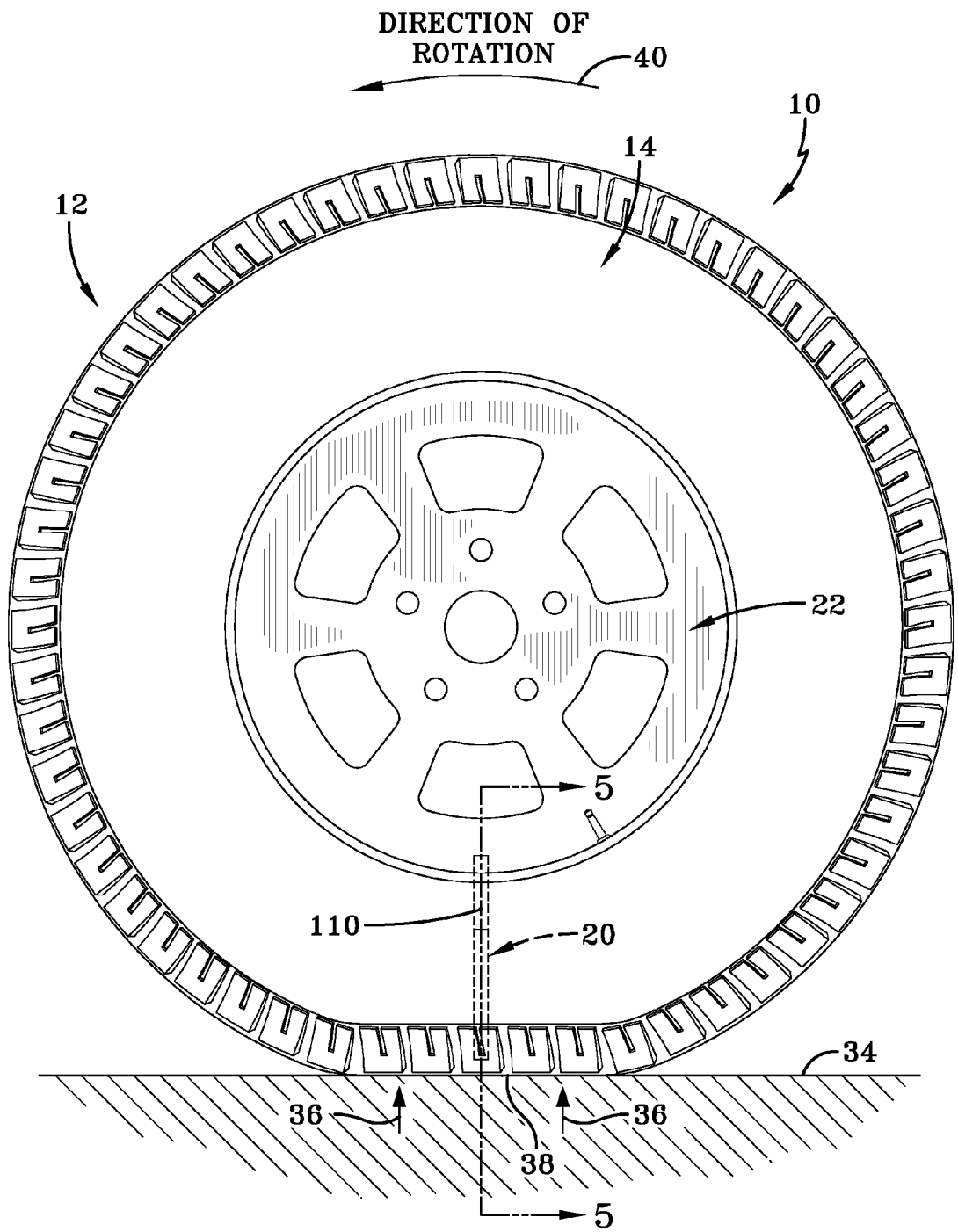
FIG. 3B is a side view showing pump location in a compressed area of tire.
Figure 5:
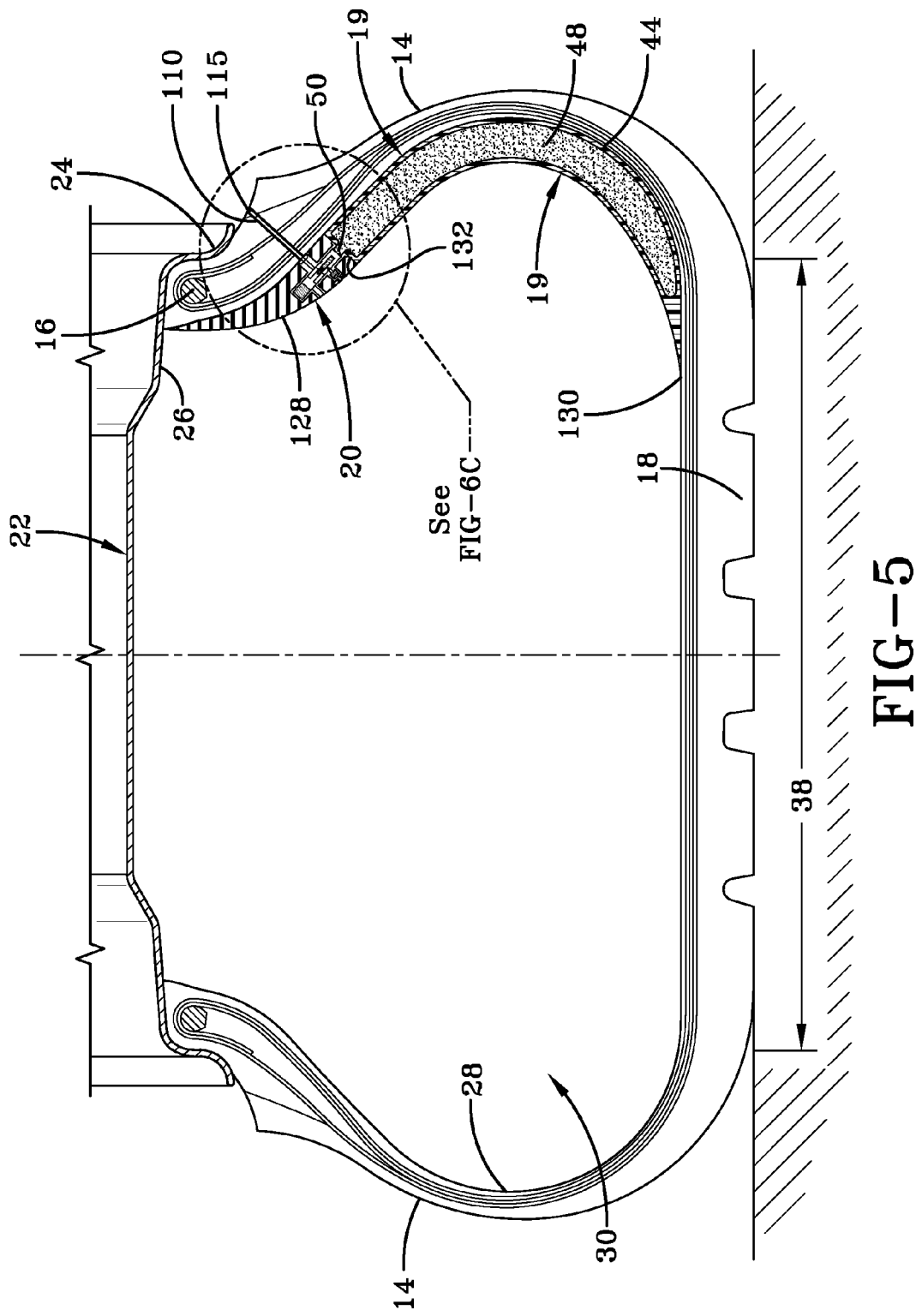
FIG. 5 is a sectioned view taken from 5-5 of FIG. 3B.

The tire assembly 10 mounts to a vehicle and engages a ground surface 34. Contact area between the tire 12 and the ground surface 34 represents the tire footprint 38. The compression actuator assembly 19 mounts to a sidewall region 42 of the tire 12 having a relatively high flex-deformation as the tire rotates in direction 40 against ground surface 34 as shown in FIGS. 3A and 3B. As the tire rotates, the compression actuator assembly 19 and pump assembly 20 will rotate with the tire. The compression actuator assembly 19 will be subjected to compression forces resulting from the sidewall flexing or bending when the assembly 19 is opposite the tire footprint 38 for a purpose explained below. FIG. 3A and section view FIG. 4 show the compression actuator assembly 19 and pump assembly 20 location in a non-compressed area of the tire 12 while FIG. 3B and section view FIG. 5 show the assemblies 19 and 20 in a compressed area of the tire 12. In the position of FIG. 5, the compression actuator assembly 19 will be subjected to the compression forces 36 generated within tire footprint 38. The tire rotates in direction 40 and in the opposite direction during normal operation of a vehicle. As such, the coupled assemblies 19, 20 rotate with the tire in both directions and are subjected to compression forces generated within the sidewall 14 in both forward and reverse tire rotational directions.

In reference to FIGS. 2A, 2B, 4, 5, 6A, 6B, 6C, 6D, and FIG. 7, the compression actuator assembly 19 includes an elongate hollow containment body 44 formed from a resilient deformable material composition such as thermoplastic resin and/or rubber compound. The body 44 so composed is thus capable of reciprocally and resiliently undergoing a cyclic deformation into a deformed state and recovery into an original non-deformed state when subjected to bending force. The elongate body 44 as shown in FIG. 2A, 4, is sized and shaped to generally follow the inner contour of the tire sidewall 14 from the tread region 18 to the bead area 16. The hollow, elongate form of the containment body 44 may be affixed to the inner liner 28 of the tire at adhesive region 21 or modified in form for incorporation into the tire sidewall as will be explained.

The containment body 44 includes an enclosed central reservoir cavity 46 filled with a volume of non-compressible medium 48. The medium may be in either foam or fluid form. Medium suitable for use in the subject application may include, but is not limited to water with an antifreeze additive. The medium 48 is enclosed by the body 44 within the cavity 46 and generally fills the cavity 46. An outlet conduit 50 is provided to the body 44, the conduit 50 extending generally axially from the body 44 and containing an inner outlet conduit bore 51 through which a displaced quantity of medium 48 may travel in reciprocal directions. The conduit 50 extends to a leading end surface 60.

Figure 6A:
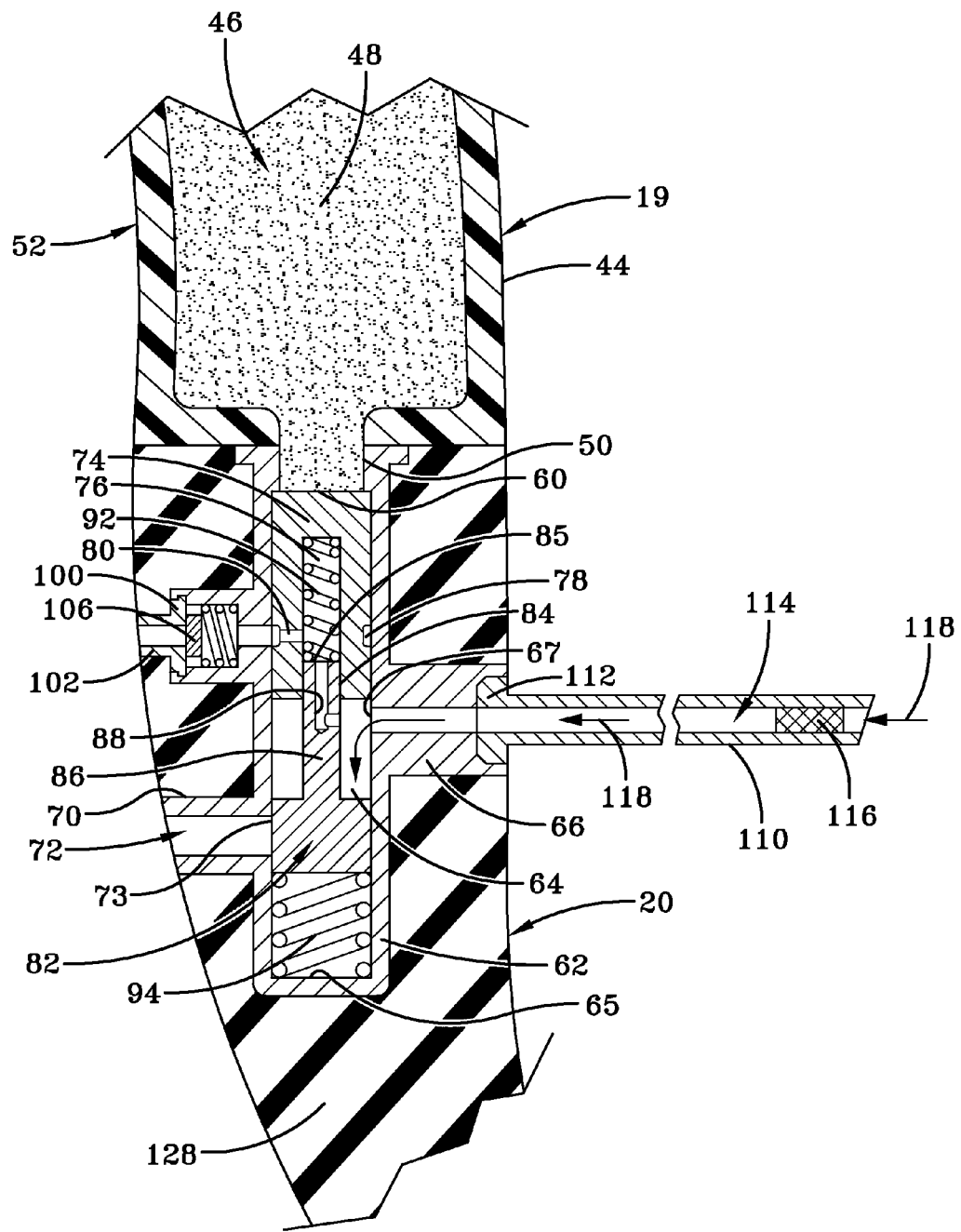
FIG. 6A is an enlarged view of the pump showing piston locations at rest

Positioned as shown in FIGS. 2A, 2B, 4, 5, the containment body 44 is subjected to bending forces from the tire sidewall 14 as the region of the sidewall to which body 44 attaches passes proximate to the tire footprint and is compressed by forces 36 on the tread 18 (FIGS. 3B, 5). Bending forces 36 applied to bend the sidewall region 14 serve to cause a commensurate bending deformation 52 of the medium containment body 44 as shown in FIGS. 6A, 6B, 6C and 6D. The deformation 52 introduced into the body 44 by bending tire sidewall 14 proximate to the tire footprint 38 causes displacement of a quantity 54 of the medium 48 along the outlet conduit 50 in the direction shown at arrow 56 of FIG. 6B. Pressure from the displaced medium quantity 54 acts as a pressure actuator to the pumping assembly 20 as will be explained. When the tire sidewall region to which body 44 attaches leaves a proximal position to the tire footprint 38, such as the position opposite the tire footprint as depicted in FIG. 6A, the compression force in the sidewall is removed/lessened, causing a commensurate removal/lessoning of bending force into the containment body 44. Removal of bending force in the containment body 44 causes the body 44 to resume its original, non-deformed state as shown in FIG. 4 and the medium 48 to recede within the conduit 50 in direction indicated at arrow 58. The cycle of sidewall bending an unbending translates into a cyclic deformation, restoration of the containment body 44 as the tire rotates in either a forward or reverse direction and generates a cyclic compression force from displaced medium volume 54 along the conduit 50. The compression force from the displaced medium quantity 54 is in the direction 56 and is proportionate to the pressure generated by the displaced quantity of the non-compressible medium 48.

Referring to FIGS. 6A-D and 7, the pump assembly 20 is affixed to the tire carcass 12 at a location adjacent the compression actuating assembly 19, preferably in an inward radial direction relative to assembly 19. The pumping assembly 20 includes a hollow compressor body 62 of generally tubular form having an internal axially oriented air chamber 64 which extends to a lower chamber end 65. The air chamber 64 is accessible through an inlet conduit 66 which intersects the air chamber 64 at an inlet opening 67. The body 62 and conduit 66 are formed of a rigid material such as metal or plastic. Conduit 66 is generally elongate and tubular having an internal axial passageway 68 communicating with the air chamber 64 via opening 67. On the opposite side of the body 62 an outlet conduit 70 of generally tubular form having an axial passageway 72 extending there through and communicating with the air chamber 64 at outlet opening 73. The inlet conduit 66 and the outlet conduit 70 are axially offset, with conduit 66 closest to the actuating assembly 19 and conduit 70 farthest away from assembly 19.

A first cylindrical piston member 74 is sized for sliding position within an upper end of the axial air chamber 64 of the compressor body 62 and includes a blind axial bore 76 extending into an inward piston end surface 75. A recess 78 extends through an outward facing piston side and functions as a collector for the air which will come out of the valve (assembly 96). It will connect the valve and the canal inside the piston whatever is the angular position of the piston. Extending into a piston side opposite the recess 78 is a relief valve intake channel 80 that communicates with the blind bore 76.

A second cylindrical piston member 82 is sized for sliding receipt within a lower end of the axial air chamber 64 of the compressor body 62. The second piston 82 includes a cylindrical body 84 and an outward spring-compressing post arm 86 extending from the body 84 to an outward end 85. A blind bore 88 extends into the end surface 85 of the post arm. A transversely oriented inlet channel 90 extends through a side of the post arm 86 to communicate with the blind bore 88. A large coil spring 94 is provided sized to fit within the lower end 65 of the air chamber 64 within the compressor body 62. A smaller coil spring 92 is further provided and seats against surface 77 within the blind bore 76 of the first piston 74. A pressure regulating relief valve assembly 96 mounts within an inlet chamber 99 of an inlet tubular sleeve 98 extending from the compressor body 62. The sleeve 98 includes an inlet axial passageway 97 extending from the chamber 99 to the air channel 64 of the compressor body 62. The assembly 96 includes a circular body 100 having a tubular entry conduit 102 extending outward. A through bore 104 extends through the conduit 102 and body 100. A disk-shaped seal component 106 is positioned within the chamber 99 inward of the circular body 100 and is outwardly biased against the circular body 100 by a coil spring 108 seated within the chamber 99.

At the opposite side of the compressor body and affixed to the inlet conduit 66 is an inlet tube 110 having an annular abutment flange 112 at an inward end and an axial passageway 114 extending from an outward tube end 115 through the tube 110 to the inlet opening 67 of the compressor body 62. Seated within the tube passageway 114 proximate the outward tube end 115 is a porous filter component 116 that functions to filter out particulates from entering the tube passageway 114. The pumping assembly 20 is enclosed within an outer sheath or casement 128 that is shaped to complement a radially lower region of the sidewall 14 and extends from the compression actuating body 44 to a location opposite to a tire bead region. The casement 128 is formed from a protective material that is suitable for attachment to the tire innerliner by adhesive such a rubber matrix.

With respect to FIGS. 4, 5, 6A, and 7, the compression actuation assembly 19 and the pump assembly 20 are connected together as shown for incorporation into the tire carcass 12. The actuation assembly 19 is incorporated into a region of the sidewall 14 of the tire carcass 12 that experiences a high bending load as the tire rotates. The assembly 19 may either be incorporated within the sidewall 14 or affixed to the sidewall 14 by adhesive as shown. In the externally mounted assembly approach shown, the containment body 44 is complementarily shaped and curved as the sidewall region to which it attaches and extends generally from a radially outward end 130 proximate the tread region 18 radially inward along the sidewall attachment region to a radially inward end 132 proximate a bead region. The pumping assembly 20 attaches to the inward end 132 of the assembly 19 by adhesive or other suitable attachment means. The pumping assembly 20 is sheathed within an outer casing 128 composed of a tire compatible material such as rubber. The coupled compression actuation assembly 19 and pumping assembly 20 mount by adhesive attachment to the inner liner 28 of the tire carcass 12 with the assembly 20 proximate to the carcass bead/lower sidewall region 32. So positioned, the inlet tube 110 to the assembly 20 projects in an axial direction through the tire sidewall 14 to an external air-accessible outer tire sidewall side location. Positionment of the tube 110 is preferred above the rim flange 24 so that the rim flange 24 will not interfere with intake air entering the tube 110 of the pumping assembly 20.

As will be appreciated, the outlet conduit 50 of the compression assembly 19 couples into the upper end of the compressor body 62 as the outlet conduit 50 of actuator body 44 is received in sealing engagement with the upper end of the compressor body 62. The compressor body 44 abuts against the casing 128 containing the pumping assembly 20. Once the assemblies 19 and 20 are attached together, they may be attached to a region of the tire sidewall 14 as shown in FIGS. 2A and 4 and described previously. The first and second pistons 74, 82 are mechanically coupled as the post projection 86 from the second piston 82 projects into the bore 76 and against the spring 92 seated within bore 76. Axial movement of the pistons 74, 82 are thus synchronous within the air chamber 44 in both radial directions.

FIGS. 6A-D depict the operation in sequence of the pump assembly 20 and compression actuator assembly 19. FIG. 6A shows the pump assembly 20 with the pistons 74, 82 in the at rest positions. The position shown correlates with a position of the assemblies 19, 20 mounted to a rolling tire as shown in FIG. 3A at a rotational position opposite to the tire footprint. The sidewall 14 area supporting assemblies 19, 20 when opposite the tire footprint (FIG. 6A) is not flexed or bent from the tire contact with ground surface. Accordingly, the compression actuator body 44 has a bending deformation 52 that generally correlates with the curvature of the unbent sidewall 14. The medium 48 enclosed within the body 44 is generally at rest and contacts the leading medium surface 60 within conduit 50 against the end of piston 74. The outer piston 74 is retracted toward the outer end of the air chamber 64 under spring bias from coil spring 92.

In the "at rest" position of FIG. 6A, the piston 74 is axially above the intake opening 67 of the inlet conduit 66. As a result, air from outside of the tire is admitted through the filter 116 and into the bore 114 of the inlet conduit 110 from which it channels through the opening 67 of the inlet conduit 66 and into the air chamber 64. Arrows 118 show the path of inlet air travel. The piston 82 is in an axially raised position within the body air chamber 64 and blocks off the outlet opening 73 of the outlet conduit 70. Springs 92, 94 are in respective uncompressed conditions. The relief valve assembly 96 is generally in a closed position so long as the pressure within the tire cavity remains below a preset recommended inflation pressure. In the closed position, the spring 108 biases the stop disk head 106 against the opening 102 through conduit body 100. Should the pressure within the tire cavity exceed a pressure threshold, the air pressure from the cavity will force the stop 106 away from the conduit opening 102 and allow air to escape from the tire cavity.

Figure 6B:
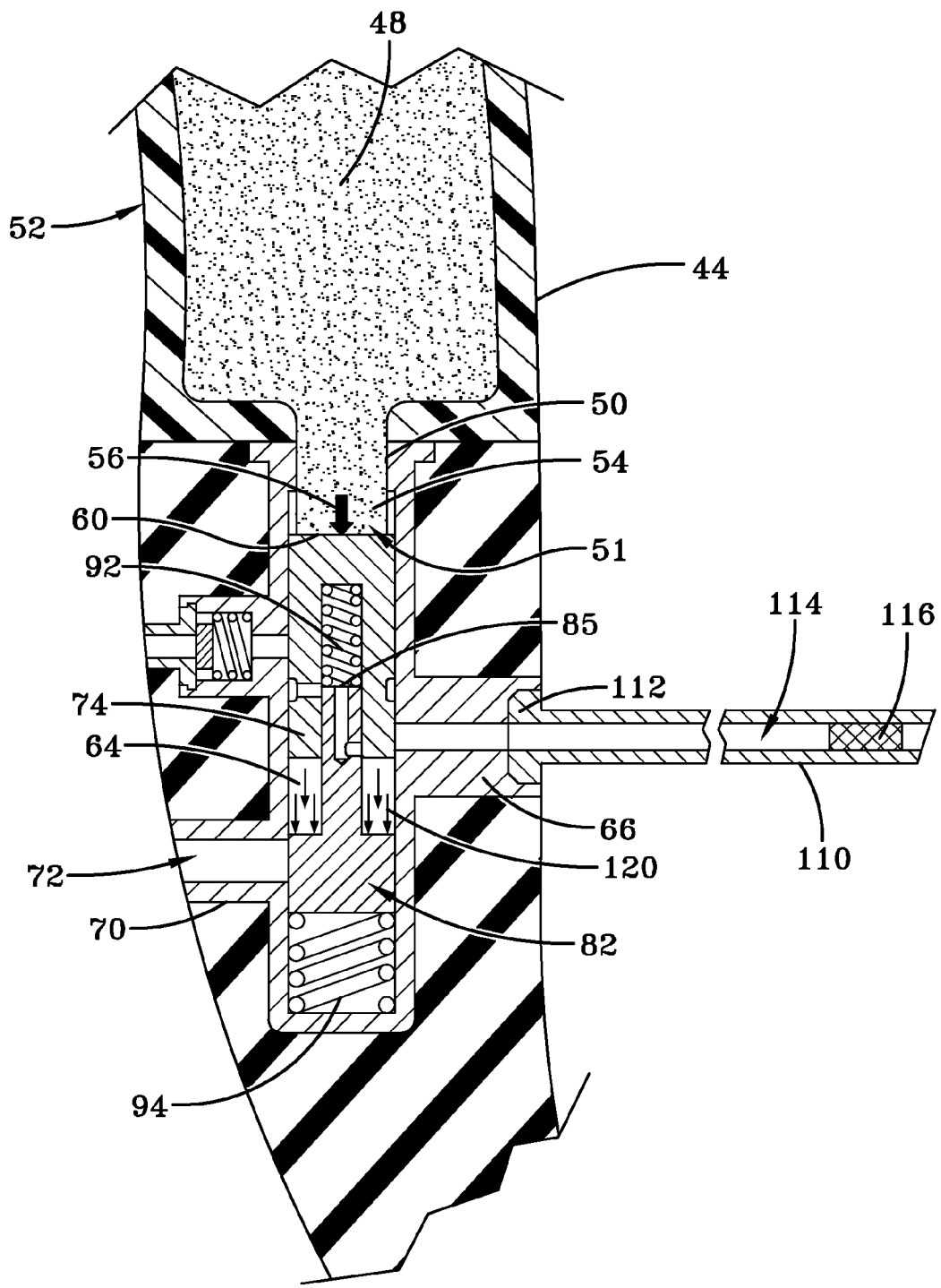
FIG. 6B is an enlarged view of the pump showing viscoelastic material moving the upper piston downward and compressing air between the pistons.

As the region of the sidewall 14 carrying the assemblies 19, 20 rotates into opposition to the tire footprint, the sidewall 14 flexes and bends, causing a commensurate flexing of the compression actuator body 44 as shown at numeral 52 of FIG. 6B. FIG. 6B shows that the viscoelastic material 48, having non-compressible material properties, in response to the bending of body 44 is forced lower within the outlet conduit 50 and exerts a downward pressure on the first piston 74 as indicated by arrow 56. The leading end surface 60 of the medium 48 bears against the outward surface of the piston 74 and overcomes the resistance of coil spring 92 by compression of spring 92 to allow piston 74 to move lower into the air chamber 64. In so doing, the piston 74 moves into a position blocking air intake into the chamber 64 through the intake tube 110 and compresses the volume of air within the chamber 64. Increased pressure of air within the chamber 64 forces the second piston 82 lower within the air chamber 64 and compresses the coil spring 94.

Figure 6C:
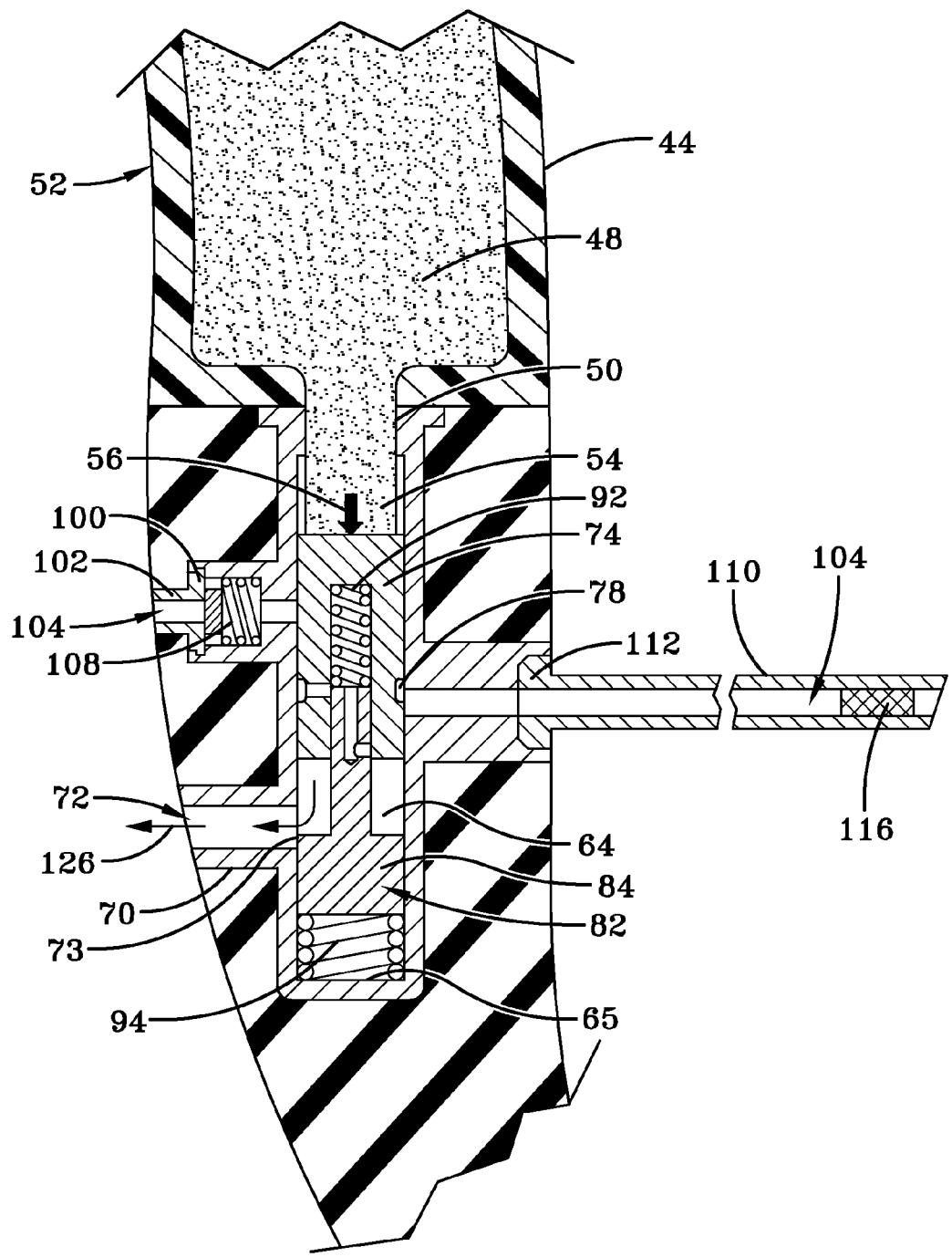
FIG. 6C is an enlarged view of the pump showing the upper and lower pistons moving and releasing compressed air into tire cavity.

When the piston 82 has moved a sufficient axial distance within the air chamber 64, the outlet opening 73 into the outlet conduit channel 72 ceases to be obstructed by the piston 82 as shown in FIG. 6C and FIG. 5 Pressurized air from the chamber 64 is thus forced through the channel 72 and into the tire cavity in the direction indicated by arrow 126. When the pumping of air is complete and pressure within chamber 64 against the second piston 82 is discontinued, the piston 82 is forced axially upward and back into the at-rest position shown both in FIG. 6D and FIG. 6A.

Figure 6D:
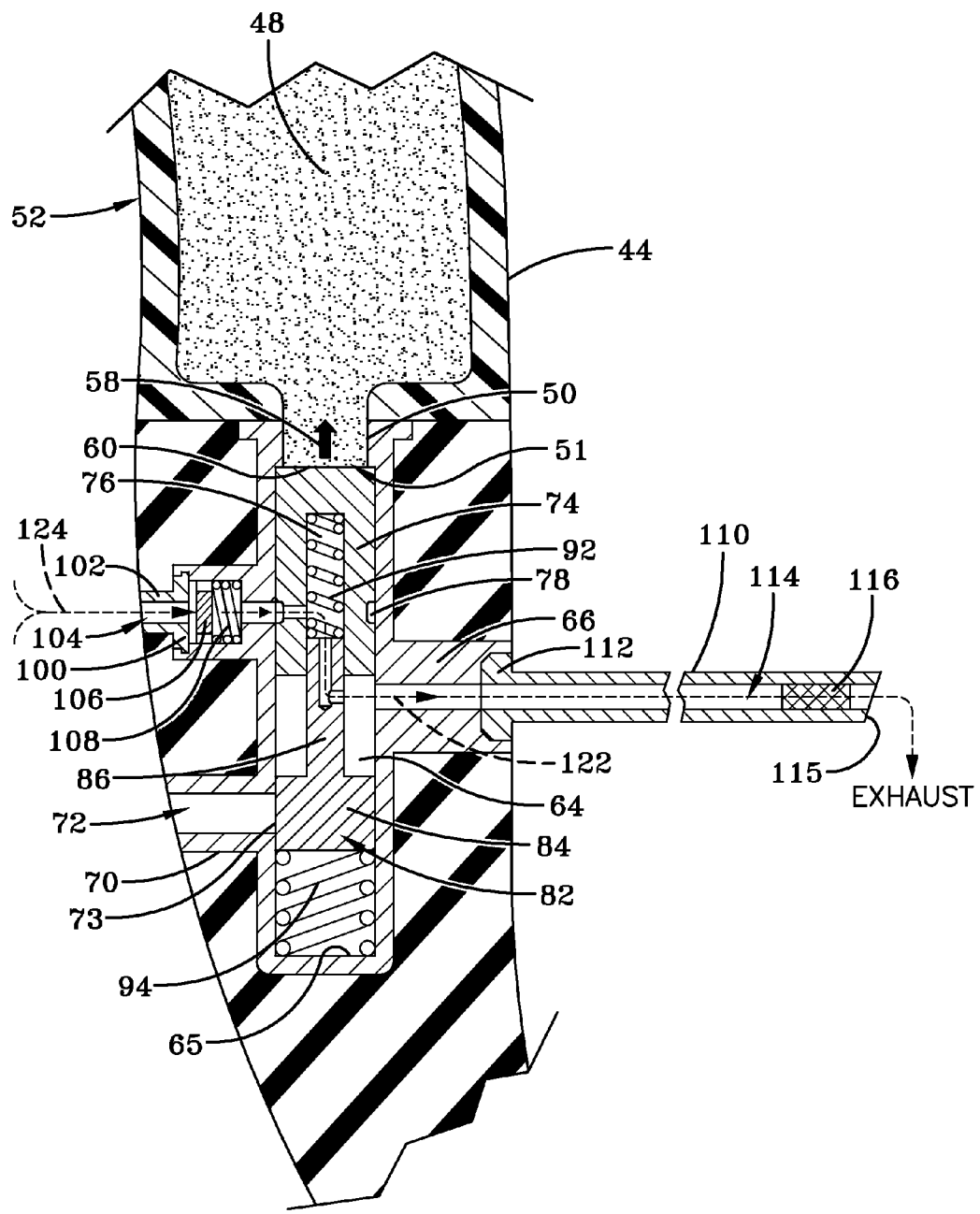
FIG. 6D is an enlarged view of the pump showing the pistons at rest and the relief valve releasing cavity over pressure to atmosphere.
Figure 7:
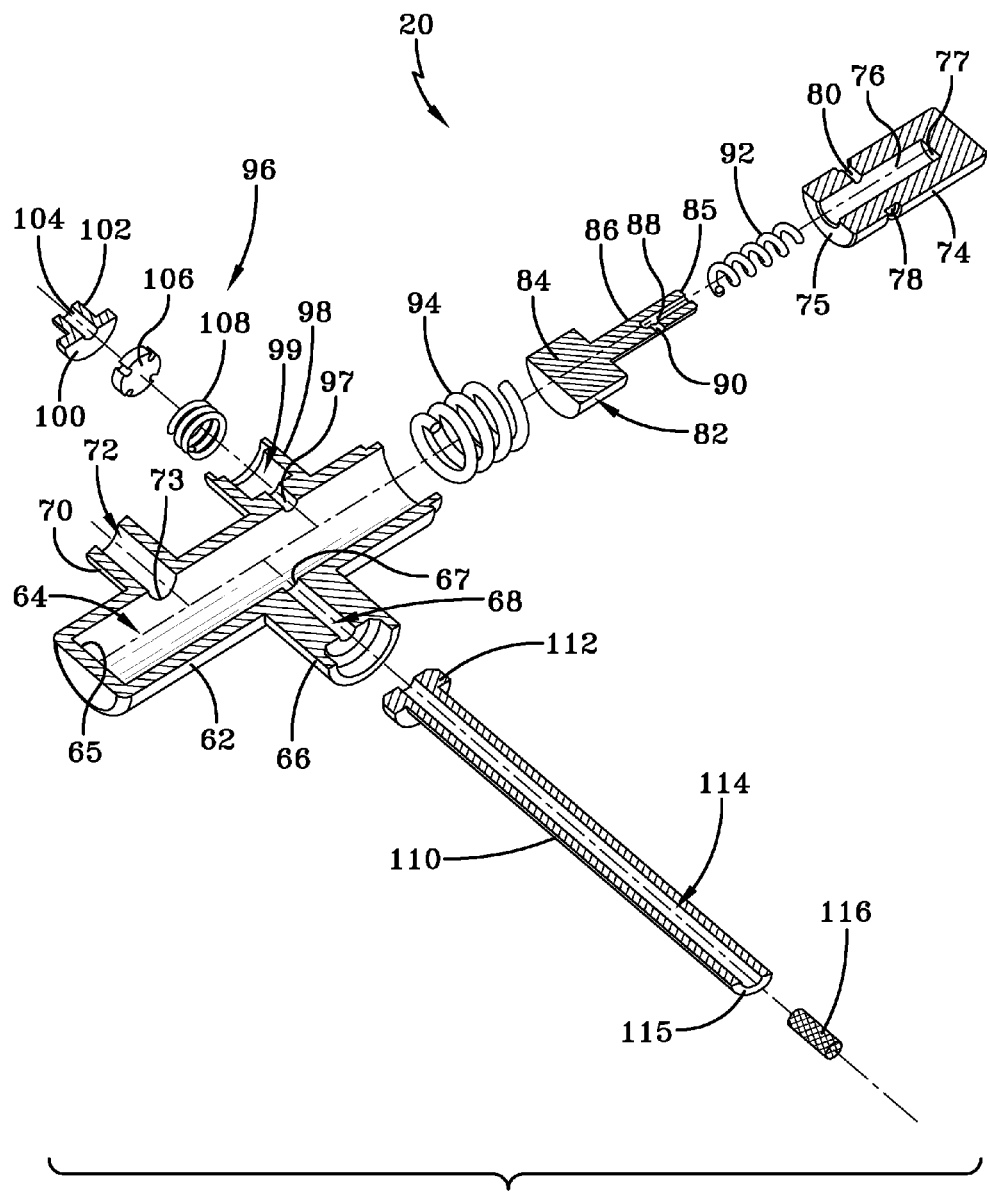
FIG. 7 is an exploded cross section of the pump body.
Figure 8:
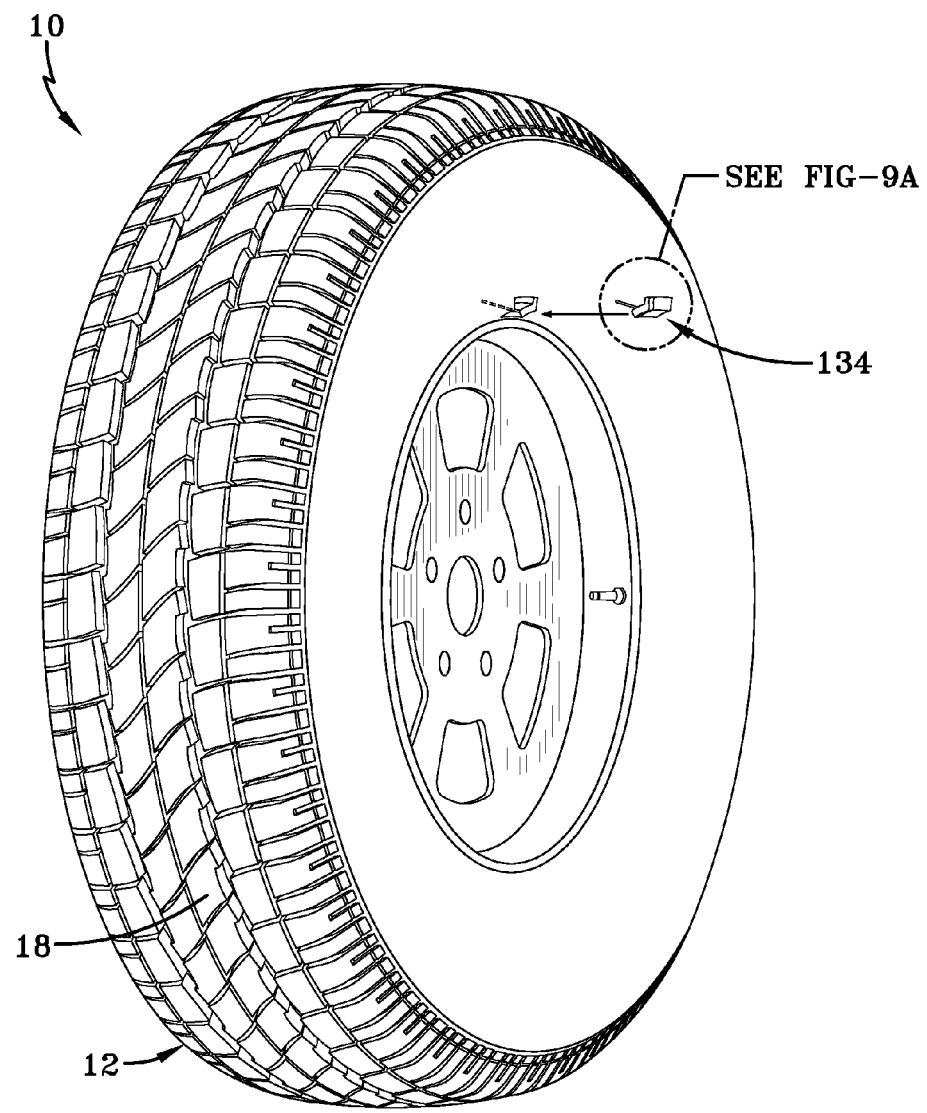
FIG. 8 is a perspective view of a tire showing the pump location in a second embodiment.
Figure 9A:
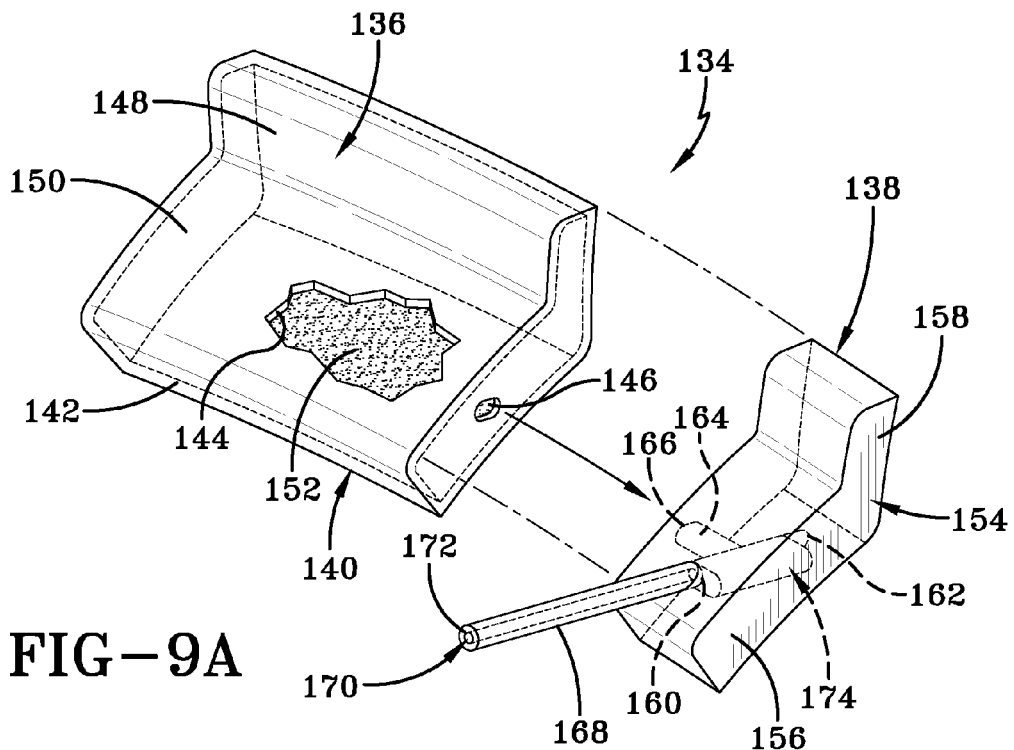
FIG. 9A is a perspective view of exploded 2-part pump of the second embodiment.
Figure 9B:
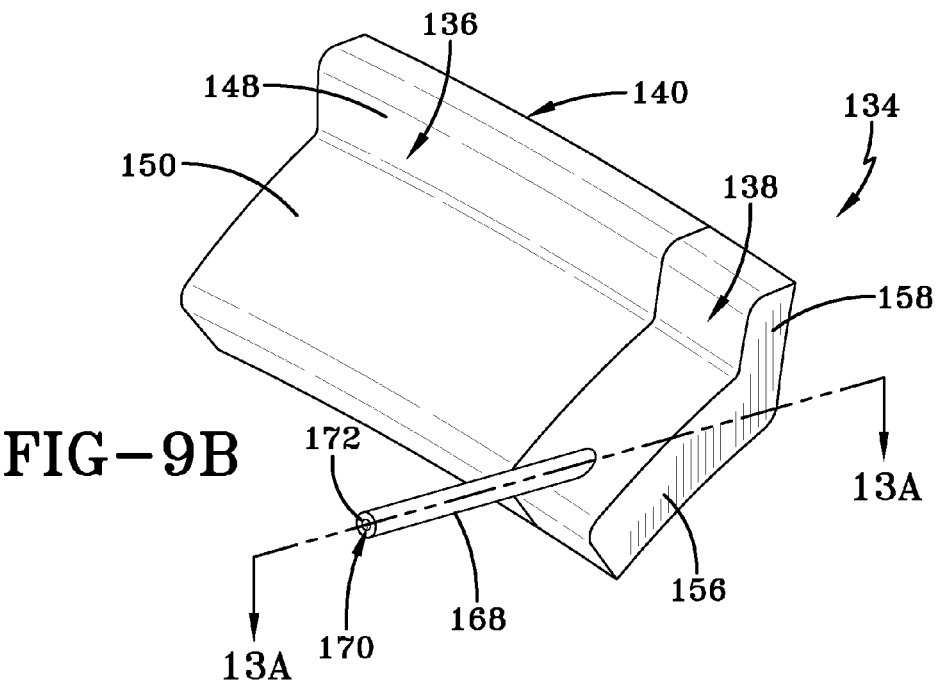
FIG. 9B is a perspective view of the assembled pump.

As seen from FIG. 6D, once removal of the quantity of pressurized air within the chamber 44 into the tire cavity is complete, with further rotation of the tire the assemblies 19, 20 with the attachment region of sidewall 14 leave the high stress position opposite the tire footprint and the tire sidewall region resumes an unstressed curvature as shown in FIGS. 2A and 3A. The return of the sidewall 14 to an original curvature configuration outside of the tire footprint is accompanied by and synchronous with a return of the actuator body 44 to an unbent configuration. As the actuator body 44 resumes its original curvature, and commensurate with the end of the pumping cycle of air from air chamber 64, piston 82 moves axially upward under the influence of spring 94 which forces the piston 74 in a radial upward movement. The viscoelastic medium 48 recedes into the original containment form of the body 44 and the pumping of air into the tire cavity is discontinued until the assemblies 19, 20 rotate with the tire back into alignment opposite the tire footprint. With each revolution, the pumping of air from chamber 64 into the tire cavity occurs in cyclic fashion. It will be appreciated that the operation of the air pumping action is independent of the direction of tire revolution and will occur in either a forward or reverse tire travel.

FIG. 6D also depicts view of the pump assembly 20 wherein pistons 74, 82 are in the at-rest position while the relief valve assembly 96 functions to vent tire cavity overpressure air to the atmosphere. The relief valve assembly 96 is generally in the closed position shown in FIGS. 6A through 6C and only opens when the air pressure within the tire cavity exceeds a recommended upper threshold. In such an event, the stop body 106 is forced laterally out of sealing engagement against with conduit flange 100 and overcoming biased resistance from the coil spring 108. The passageway 104 is thus opened to allow over-pressure air from the tire cavity through the conduit 102 and the relief channel 80 within piston 74 as indicated by directional arrow 124. The pressurized air follows a path through the blind bore 76 of piston 74, through the blind bore 88 within the coupling post 86 of piston 82, and into the bore 114 of tube 110 as indicated by directional arrow 122. The expelled over-pressure air exhausts to the atmosphere through filter unit 116 and out of tube end 115. The exhaust of air through filter 116 operates to clean particulates from the filter as well as correcting the over-pressure within the tire cavity. Once the tire cavity pressure is reduced below the threshold recommended pressure, spring 108 will uncoil and pressure the stop body 106 against the conduit flange end 100 and thus close off the tire cavity until over-pressure exhausting of air from the tire cavity is necessary.

Figure 10A:
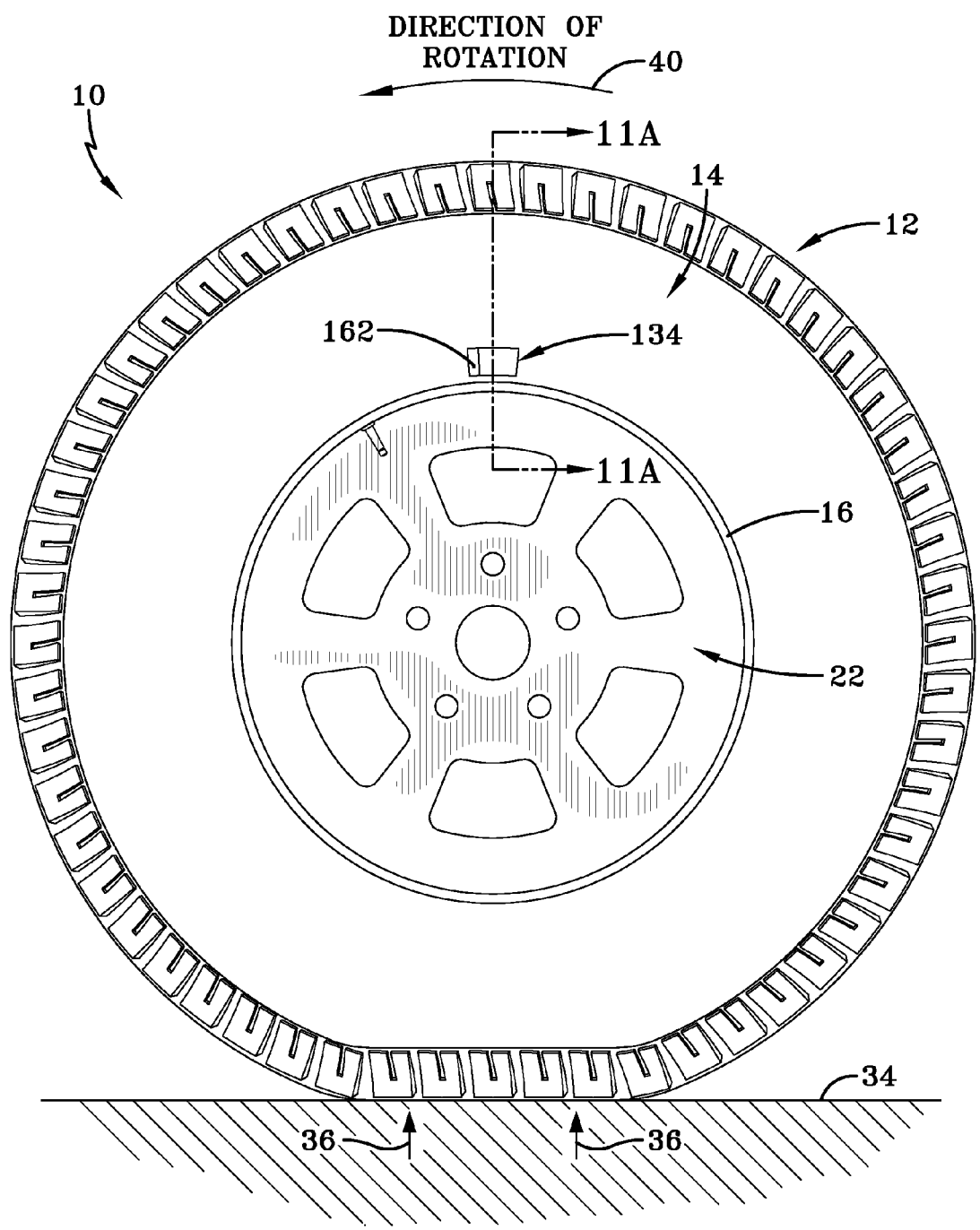
FIG. 10A is a side view showing pump location in non-compressed area of a tire.
Figure 10B:
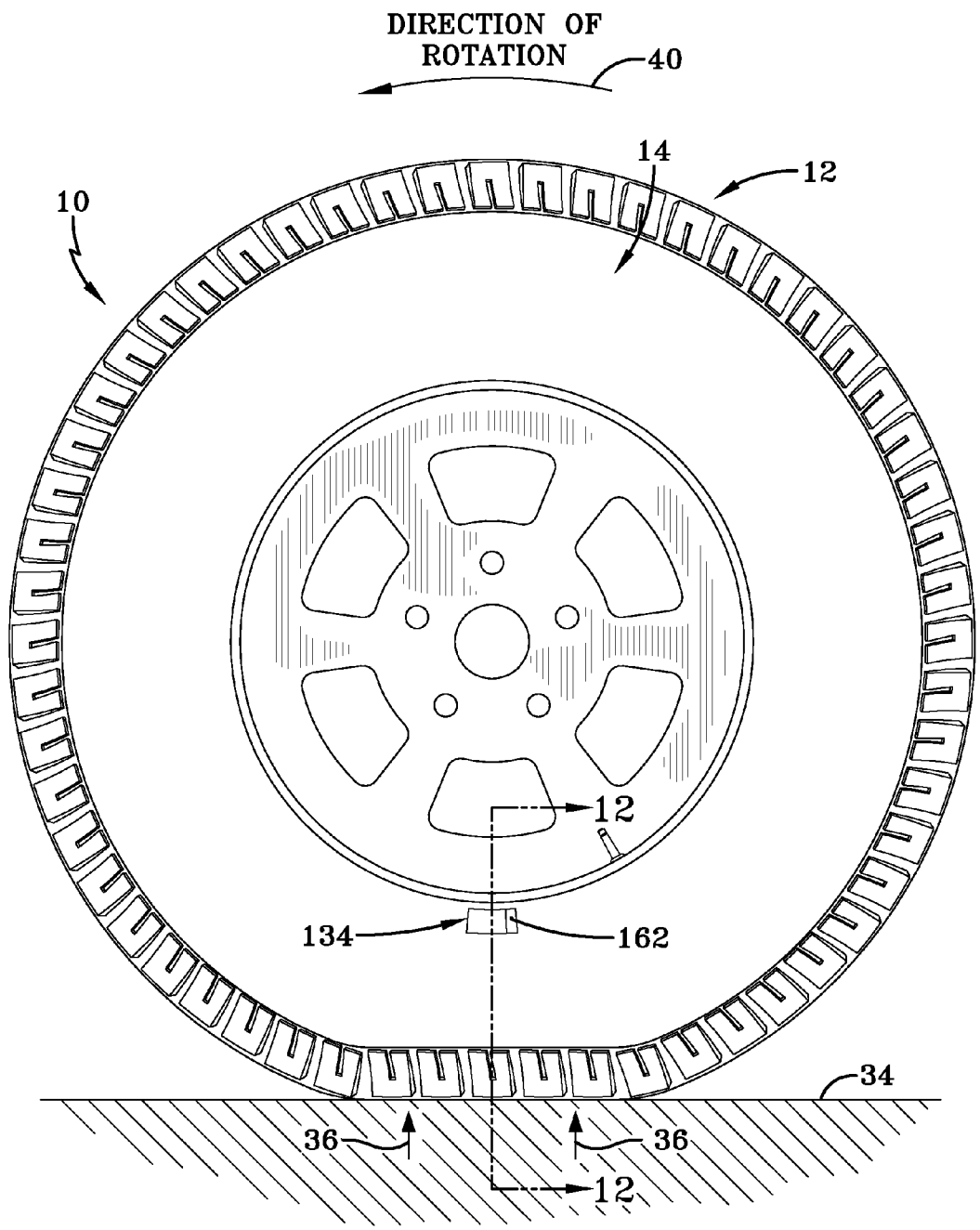
FIG. 10B is a side view showing pump location in a compressed area of tire.

Referring to FIGS. 9A, 9B, 10A, 10B, 11A, 11B, 12A, 12B, 13A through 13D, 14A through 14C, inclusive, an alternative embodiment of a pump and compression actuating assembly 134 is shown including a compression actuating assembly 136 coupled to a pump assembly 138 to form an L-shaped insert body 140. The body 140 mounts to a lower sidewall region of a tire carcass 12 proximate to a bead region 16 as shown in FIGS. 10A, 10B. The compression actuating assembly 136 has a deformable hollow body 142 forming a containment chamber 144 communicating with an outlet portal 146. The hollow body 142 is configured at ninety degrees into an L-shape having upright body portion 148 extending from horizontal body portion 150. A viscoelastic medium on non-compressible material 152 fills the containment chamber 144 as previously described in reference to the first embodiment.

The pump assembly 138 likewise forms an L-shaped encapsulation sheath body 154 affixed to the L-shaped compression actuating body 142. Body 154 includes an upright body portion 158 extending from horizontal body portion 156. An outlet orifice 160 is positioned within the horizontal portion 156 and an inlet orifice 162 in a side facing region of the portion 156. An outlet conduit 168 is attached to the outlet orifice 160 and includes an axial passage 170 extending to a remote end 170.

Figure 11A:
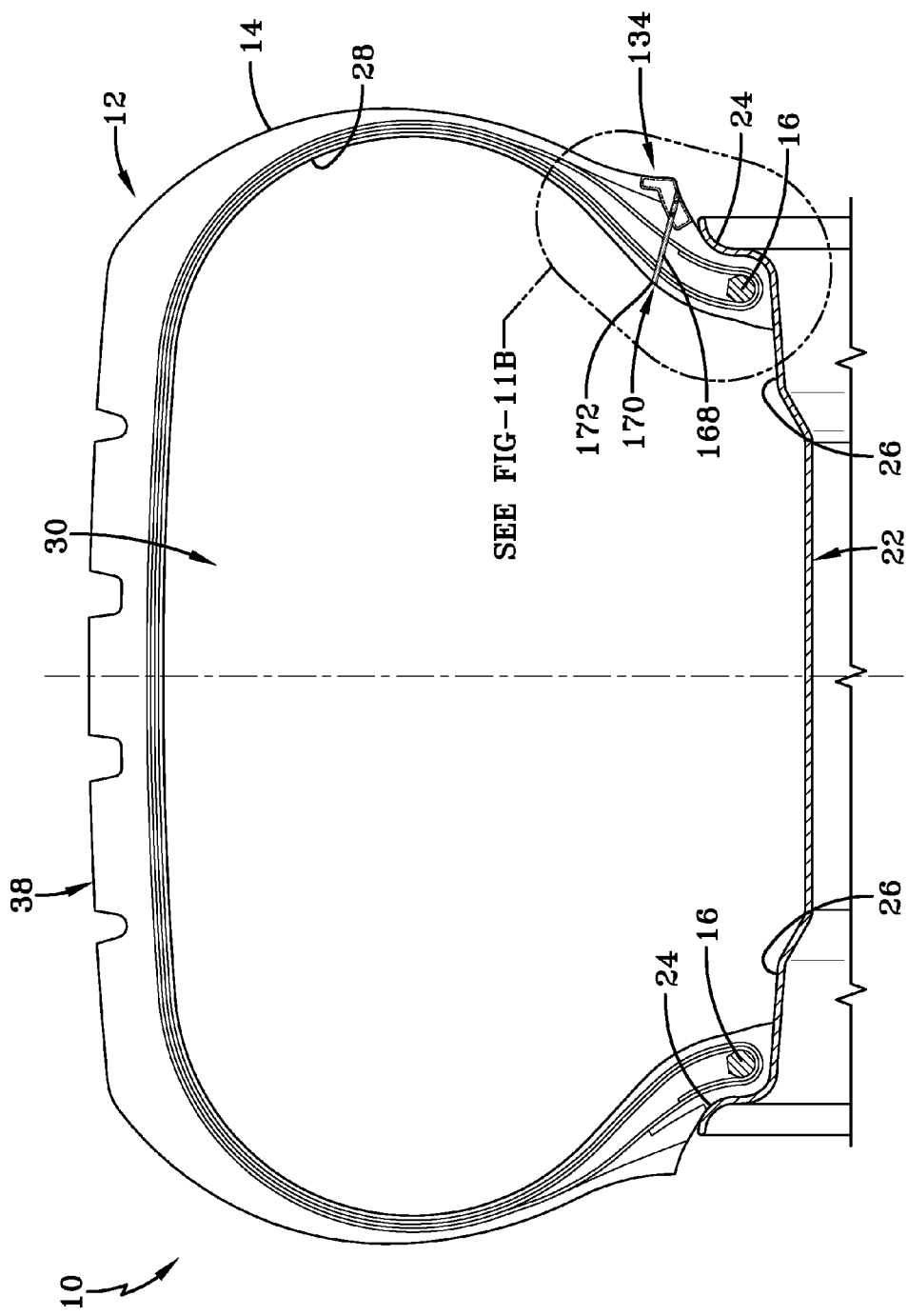
FIG. 11A is an enlarged view of the pump taken from FIG. 11.
Figure 11B:
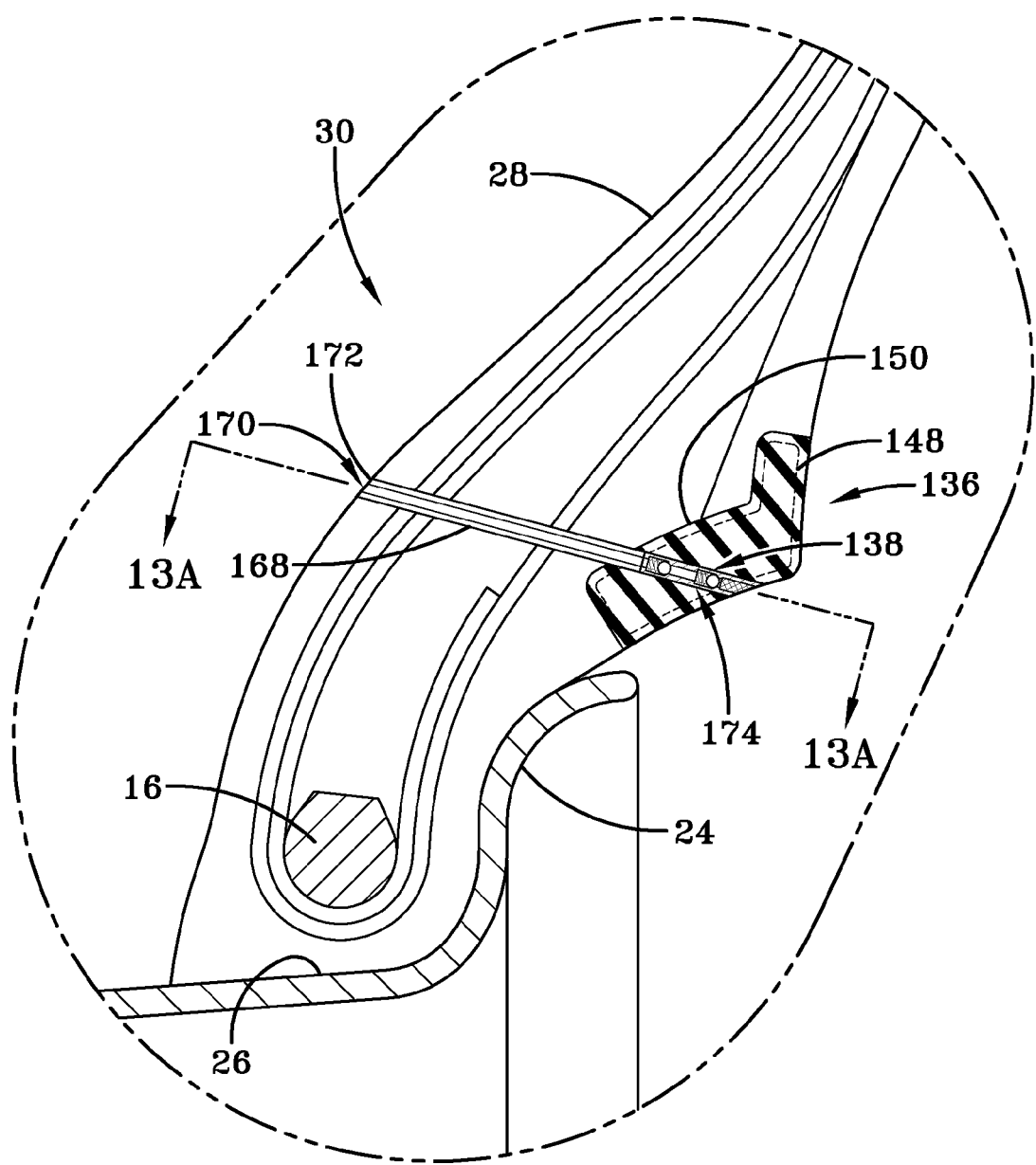
FIG. 11 is a sectioned view taken from 11-11 of FIG. 10A.

FIGS. 10A and 10B show the mounting of the L-shaped pump assembly 134 to a tire at a lower sidewall region proximate to a tire bead location. As with the embodiment previously described, the pump assembly 134 rotates with the tire from a location outside of proximity to the tire footprint (FIG. 10A) into a position opposite the tire footprint (FIG. 10B) with each tire revolution. As with the first embodiment, the assembly 134 body 140 is bent by stress induced from a bending of the tire sidewall as the rotational position of assembly aligns opposite the tire footprint (FIG. 10B). FIGS. 11A and 11B show the relative position of the assembly 134 within the lower region of sidewall 14 where the assembly body 140 is subjected to high bending forces as the tire rotates. The outlet end 172 of the outlet conduit 168 extends through the tire wall to the cavity 30 of the tire. Compressed air from the compressor body 174 travels along passage 170 and into the tire cavity to keep the inflation pressure of the tire at a desired level.

Figure 12A:
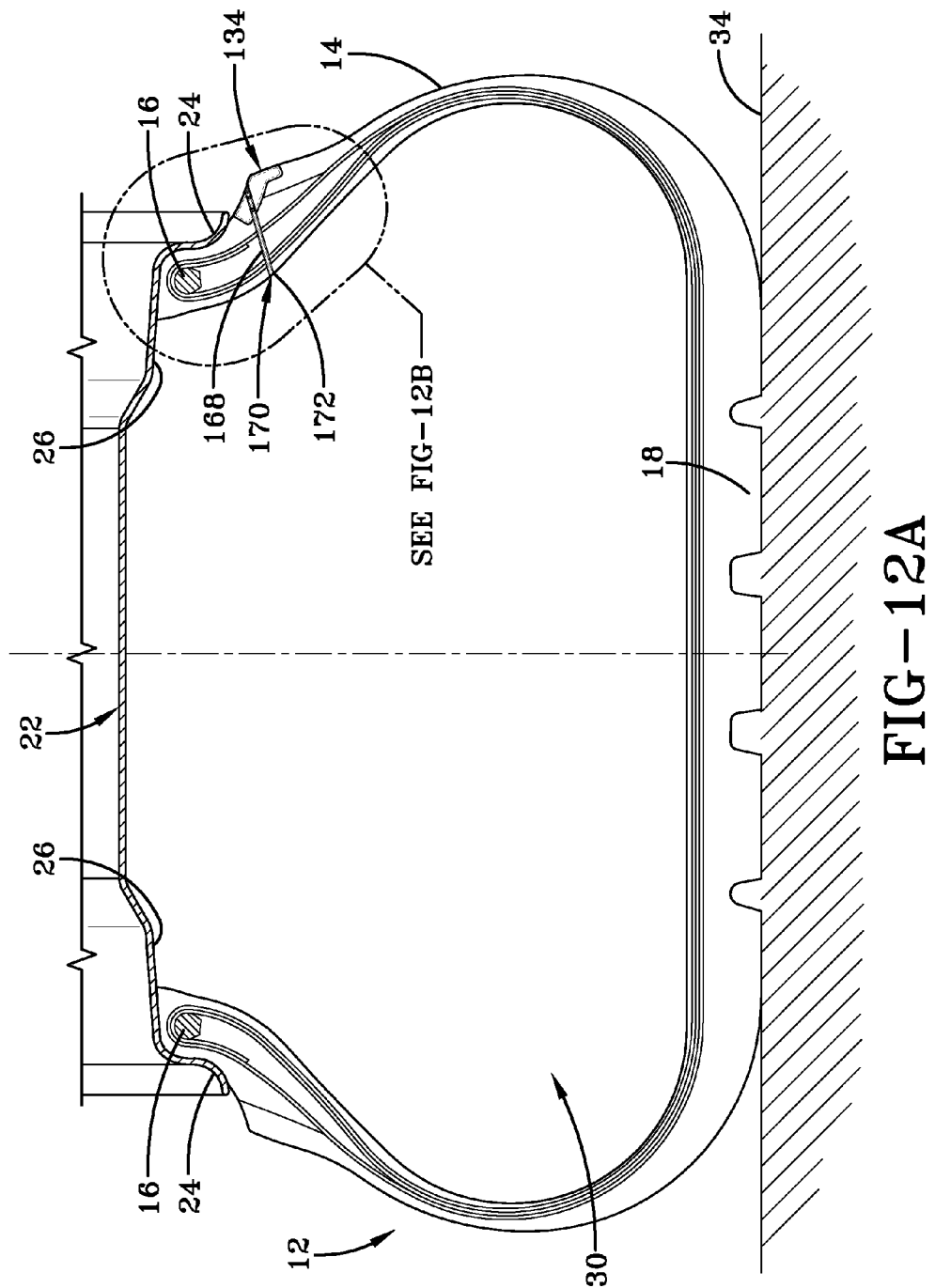
FIG. 12A is an enlarged view of the pump taken from FIG. 12.
Figure 12B:
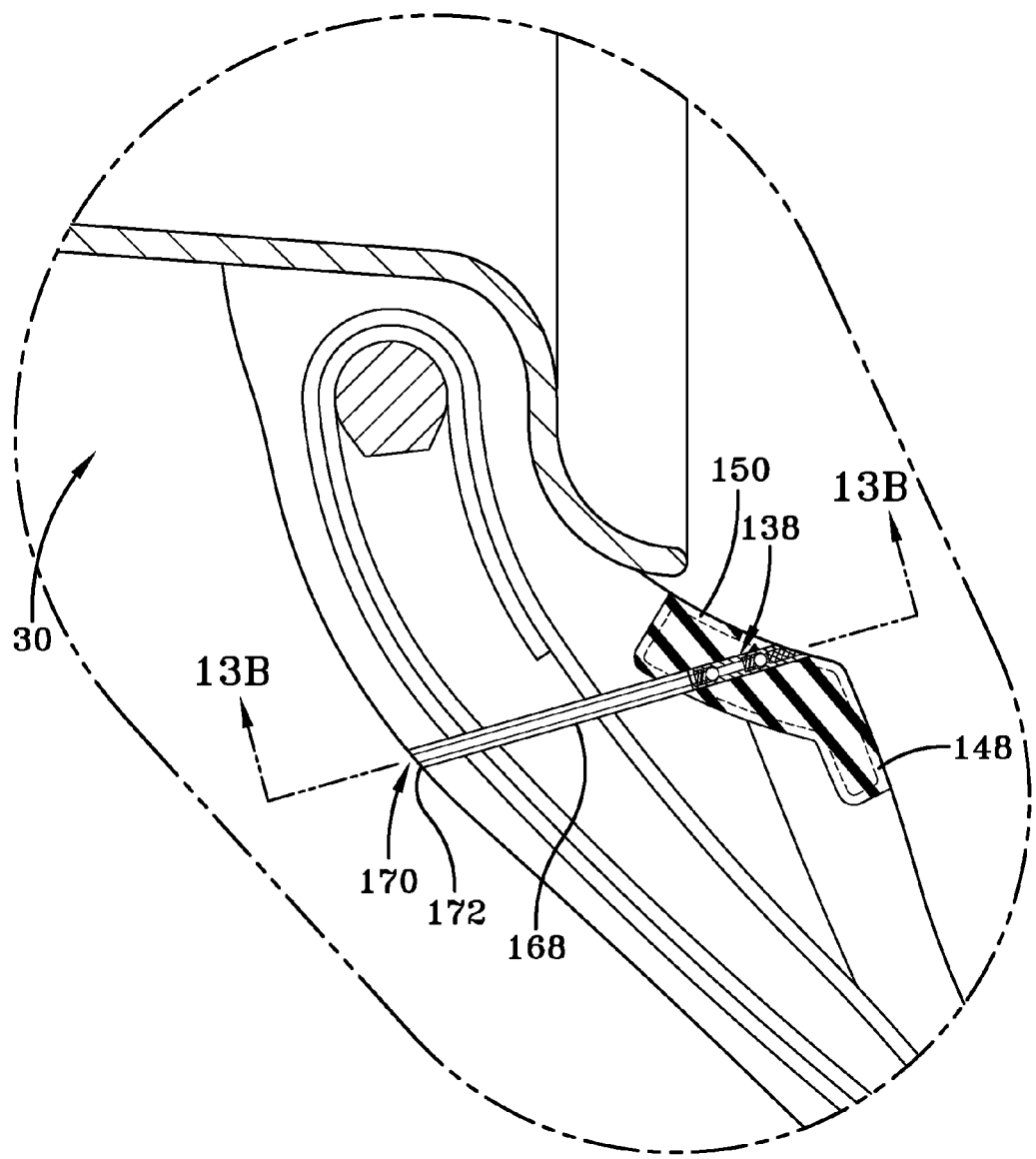
FIG. 12 is a sectioned view taken from 12-12 of FIG. 10B.

FIG. 11A is a sectioned view taken from a pump location in a non-compressed area of the tire as shown in FIG. 10A. FIG. 11B is an enlarged view of the pump assembly 134 of FIG. 11A. FIG. 12A is a sectioned view taken from a pump location in a compressed area of the tire as shown in FIG. 10B. FIG. 12B is an enlarged view of the pump assembly 134 as depicted in FIG. 12.

With reference to FIGS. 13A through 13D and 14A through 14C, the compression body 174 has an internal elongate compression chamber 176 and a pair of one-way ball valves 178, 180 positioned at opposite ends of the chamber 176. Each of the valves 178, 180 is of a type commercially available and each includes a stop ball component 182 biased by a coil spring against a seat 186. In addition, a relief pressure by-pass passage 188 is provided within the compression body 174 in parallel to the chamber 176. Seated within the passage 188 is a one-way ball valve 190 of similar configuration as the ball valves 178, 180. The passageway 188 and the chamber 176 extend in parallel between the outlet conduit 168 at one end of the body 174 and the inlet opening 162 at an opposite end.

Operation of the first alternative form of the pumping assembly 138 proceeds as follows. The L-shaped body 136 is embedded or affixed to the tire carcass in the position shown generally by FIGS. 10A and 10B. So positioned, as the tire sidewall to which the assembly 138 undergoes bending, the compression actuating body 142 will likewise undergo bending. FIGS. 13A and 13D show the pump assembly 138 in an "at-rest" status; that is, with the assembly 138 not under bending stress as the tire position of FIG. 10A represents. The ball valves 178, 180 are in a seated closed position. The valves 178, 180 are selected to open at a desired threshold pressure as will be explained.

In the at-rest position, air within the compression chamber 176 is unpressurized. The relief valve 190 is likewise seated and closed and will remain so unless the air pressure within the tire cavity 30 is over a desired pressure threshold. In an over-pressure situation, the valve 190 will open and allow air to escape the cavity 30 through passage 188 and exhausted from the inlet opening 162 to the atmosphere. The compression medium 152 is confined to the compression body chamber 176 and the inlet conduit 164 is clear.

FIG. 13B and FIG. 12B show the pump assembly 134 when the tire has rotated the assembly into a position opposite the tire footprint (FIG. 10B). The compression body 174 is then subjected to a bending force and is deformed. The bending of the body 174 forces the viscoelastic material 152 from the chamber 144 into and along the conduit 164 (direction 192) which, in turn, acts to compress air within the compression chamber 176. Pressure from the compressed air opens the valve 180 by unseating valve ball 182 and air is channeled into the outlet conduit 168 to the tire cavity 30.

FIG. 13C represents the pump assembly 134 after further rotation of the tire occurs, positioning the pump assembly away from the tire footprint such as the position shown in FIG. 10A. The removal of bending force to the body 174 allows the resilient body to return to its original configuration and chamber 176 into a form allowing the medium 152 to recede back from the conduit 164. The transfer of pressurized air from the chamber 176 draws air into the chamber 176 from the atmosphere through the unseating of one-way valve 178 from its seat 186. Air drawn into the chamber 176 forces the medium 152 back into the chamber 144 as shown at arrow 194. Valve 180 has reseated itself and blocks off air from exiting the chamber 176. A filter member 198 within the inlet end of the chamber 176 keeps particulates from entering the chamber 176.

FIG. 14D shows the assembly 134 back into its original at-rest position. In the event that an over-pressure situation arises within the tire cavity, the tire air pressure will cause the one-way valve 190 to open and air to flow in direction 196 back through the passage 188 for exhaust through filter 198 and into the atmosphere. The back flow of air through filter 198 helps to keep the filter clean. As with the first embodiment, the pump assembly 134 operates in either direction of tire rotation and pumps air into the tire during each cycle of tire revolution.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A self-inflating tire system comprising:
    a tire having a tire carcass comprising a tire cavity defined by a tire inner liner, first and second sidewalls extending respectively from first and second tire bead regions to a tire tread region;
    compression actuator means mounted to the tire carcass for compressing air for delivery to the tire cavity, the compression actuator means comprising a hollow containment body formed from a resilient deformable material composition and containing a quantity of a non-compressible medium, the containment body affixed to a relatively high flex-deformation region of the tire carcass and the containment body reciprocally transforming between a deformed state and a non-deformed state responsive to deformation and recovery of the tire high flex-deformation region in a rolling tire, respectively;

and wherein the actuator means containment body in the deformed state displacing a pressurized displaced quantity of the non-compressible medium, the pressurized displaced quantity of the non-compressible medium operative to generate a compression force from which a volume of air delivered to the tire cavity is pressurized;

a pump assembly affixed to the tire carcass, the pump assembly comprising a compressor body affixed to the containment body and having an internal air chamber, the pump assembly operative to compress air within the compressor body internal air chamber responsive to the displaced quantity of the non-compressible medium;

wherein the internal air chamber of the compressor body having an inlet opening for admitting air into the internal air chamber and an outlet opening for conducting pressurized air from the internal air chamber to the tire cavity; the air compressor body further comprising first valve means and second valve means within the air compressor body for reciprocally opening and closing the inlet opening and the outlet opening, respectively, synchronously with the cyclic transformation of the containment body.

2. The self-inflating tire system of claim 1, wherein the compression force is proportionate to the pressurized displaced quantity of the non-compressible medium.

3. The self-inflating tire system of claim 1, wherein the containment body operationally undergoes a cyclic transformation between the deformed state and the non-deformed state within a tire revolution against a ground surface.

4. The self-inflating tire system of claim 3, wherein the cyclic transformation of the containment body occurs in either a forward or rearward direction of tire revolution against the ground surface.

5. The self-inflating tire system of claim 3, wherein the deformation of the containment body is induced by a bending of a tire carcass sidewall.

6. A self-inflating tire system comprising:

a tire having a tire carcass comprising a tire cavity defined by a tire inner liner, first and second sidewalls extending respectively from first and second tire bead regions to a tire tread region;

compression actuator means mounted to the tire carcass for compressing air for delivery to the tire cavity, the compression actuator means comprising a hollow containment body formed from a resilient deformable material composition and containing a quantity of a non-compressible medium, the containment body affixed to a relatively high flex-deformation region of the tire carcass and the containment body reciprocally transforming between a deformed state and a non-deformed state responsive to deformation and recovery of the tire high flex-deformation region in a rolling tire, respectively; and wherein the actuator means containment body in the deformed state displacing a pressurized displaced quantity of the non-compressible medium, the pressurized displaced quantity of the non-compressible medium operative to generate a compression force from which a volume of air delivered to the tire cavity is pressurized;

wherein the containment body operationally undergoes a cyclic transformation between the deformed state and the non-deformed state within a tire revolution against a ground surface;

a pump assembly affixed to the tire carcass and comprising a compressor body affixed to the containment body and having an internal air chamber, the air chamber having an inlet opening for admitting air into the internal air chamber and an outlet opening for conducting air from the internal air chamber to the tire cavity; the air compressor body further comprising first valve means and second valve means within the air compressor body for reciprocally opening and closing the inlet opening and the outlet opening, respectively, synchronously with the cyclic transformation of the containment body.

7. The self-inflating tire system of claim 6, wherein further comprising relief valve means for releasing air from the tire cavity should the tire cavity air pressure exceed a preset tire inflation pressure, the relief valve means affixed to the compressor body and comprising a relief valve and an air flow passageway from the relief valve positioned to operationally reverse flow air from the tire cavity through the compressor body and out of the inlet opening of the compression body.

8. The self-inflating tire system of claim 6, wherein the first and second valve means comprise respectively a first one-way valve device and a second one-way valve device positioned at respective opposite ends of the internal chamber of the air compressor body.

9. The self-inflating tire system of claim 6, wherein the first and the second valve means comprise respectively a first piston and a second piston member seated within the compression body, the first piston member and the second piston member reciprocally moving between open and closed positions synchronous with the cyclic transformation of the containment body, and the first piston member and the second piston member operatively opening and obstructing the inlet opening and the outlet opening, respectively, of the compression body in the open and closed positions.

10. The self-inflating tire system of claim 9, wherein the first piston member compresses a volume of air within the internal air chamber of the compressor body while obstructing the inlet opening.

11. The self-inflating tire system of claim 6, wherein further comprising relief valve means mounted to the tire carcass for releasing air from the tire cavity when the tire cavity air pressure exceeds a preset tire inflation pressure.

12. The self-inflating tire system of claim 6, wherein the relief valve is affixed to the compressor body and an air flow passageway from the relief valve operationally conducts a reverse flow of air from the tire cavity through the compressor body and out of the inlet opening of the compression body.

13. The self-inflating tire system of claim 6, wherein the compression actuator means comprises air compression means taken from the group:

first and second one-way valve devices positioned at respective opposite ends of the internal chamber of the air compressor body;

a first piston and a second piston member reciprocally moving between open and closed positions within the compression body.

14. A self-inflating tire system comprising:

a tire having a tire carcass comprising a tire cavity defined by a tire inner liner, first and second sidewalls extending respectively from first and second tire bead regions to a tire tread region;

compression actuator means mounted to the tire carcass for compressing air for delivery to the tire cavity, the compression actuator means comprising a hollow containment body formed from a resilient deformable material composition and containing a quantity of a non-compressible medium, the containment body affixed to a sidewall region and the containment body reciprocally transforming with the sidewall region between a deformed state and a non-deformed state responsive to deformation and recovery of the tire sidewall region in a rolling tire, respectively; and wherein the actuator means containment body in the deformed state displacing a pressurized displaced quantity of the non-compressible medium, the pressurized displaced quantity of the non-compressible medium generating a compression force for application to a volume of air delivered to the tire cavity; and wherein the containment body operationally undergoes a cyclic transformation between the deformed state and the non-deformed state responsive to tire revolution against a ground surface;

a pump assembly connected to the containment body and affixed to the tire carcass, the pump assembly comprising a compressor body having an internal air chamber, the air chamber having an inlet opening for admitting air into the internal air chamber and an outlet opening for conducting a pressurized quantity of air from the internal air chamber to the tire cavity; the compressor body positioned at the sidewall region radially inward from the containment body.

15. The self-inflating tire system of claim 14, wherein the containment body operationally undergoes a cyclic transformation between the deformed state and the non-deformed state during a tire revolution against a ground surface.

16. The self-inflating tire system of claim 14, wherein the pump assembly further comprises an air pumping mechanism operatively engaged and actuated by the compression force from the pressurized displaced quantity of the non-compressible medium during the cyclic transformation.

17. The self-inflating tire system of claim 14, wherein the containment body is configured having a complementary curvature to a curvature of the sidewall region from a radially outward containment body end proximate the tire tread region to a radially inward containment body end.

* * * * *